US008125589B2

(12) United States Patent  
Ko et al.

(10) Patent No.: US 8,125,589 B2  
(45) Date of Patent: Feb. 28, 2012

(54) DIRECT-LIT LIQUID CRYSTAL DISPLAYS WITH LAMINATED DIFFUSER PLATES

(75) Inventors: Byungsoo Ko, Seoul (KR); Mark D. Gehlsen, Eagan, MN (US); Chingwen Chen, Taoyuan (TW); Robert M. Emmons, St. Paul, MN (US); James W. Laumer, White Bear Lake, MN (US); Ji-Hyung Kim, Anyang (KR); Ji-Hwa Lee, Suwon (KR); Kang-il Seo, Suwon (KR); Ryan T. Fabick, St. Paul, MN (US); Linda M. Rivard, Stillwater, MN (US); Kenneth A. Epstein, St. Paul, MN (US); Chideuk Kim, Sungnam (KR); Youngsoo Park, Suwon (KR)

(73) Assignee: 3M Innovative Properties Company, Saint Paul, MN (US)

( * ) Notice: Subject to any disclaimer, the term of this patent is extended or adjusted under 35 U.S.C. 154(b) by 693 days.

(21) Appl. No.: 12/262,546

(22) Filed: Oct. 31, 2008

(65) Prior Publication Data

US 2009/0122228 A1      May 14, 2009

Related U.S. Application Data

(62) Division of application No. 10/966,610, filed on Oct. 15, 2004, now Pat. No. 7,446,827.

(51) Int. Cl.  
*G02F 1/1335* (2006.01)
(52) U.S. Cl. ....................................................... 349/64
(58) Field of Classification Search ...................... 349/64  
See application file for complete search history.

(56) References Cited

U.S. PATENT DOCUMENTS

| 3,655,263 A | 4/1972 | Hoffman et al. |
| 4,074,004 A | 2/1978 | Bateson et al. |
| 4,415,509 A | 11/1983 | Toyooka et al. |
| 4,737,559 A | 4/1988 | Kellen et al. |
| 5,112,722 A | 5/1992 | Tsujino et al. |
| 5,162,087 A | 11/1992 | Fukuzawa et al. |
| 5,269,977 A | 12/1993 | Nakahashi et al. |

(Continued)

FOREIGN PATENT DOCUMENTS

CN         1104325          6/1995

(Continued)

OTHER PUBLICATIONS

U.S. Appl. No. 60/690,992, entitled "Diffuse Multilayer Optical Article", filed on Jun. 15, 2005.

*Primary Examiner* — James Dudek

(57) ABSTRACT

In a directly-illuminated liquid crystal display (LCD), for example an LCD monitor or an LCD-TV, a number of light management films, including a diffuser layer, lie between the light source and the LCD panel to provide bright, uniform illumination. The diffuser layer is attached to a substrate which is separate from the light source and the LCD panel, or may be attached to either the LCD panel or, when using a two dimensional light source, to the light source. The other light management layers may also be attached to the separate substrate or to the LCD panel or two-dimensional light source. High levels of illumination uniformity at the LCD may be achieved with a uniform (non-patterned) diffuser, even with relatively low levels of diffusion, when the diffuser is used with a brightness enhancing layer.

8 Claims, 17 Drawing Sheets

U.S. PATENT DOCUMENTS

| | | |
|---|---|---|
| 5,540,978 A | 7/1996 | Schrenk |
| 5,592,047 A | 1/1997 | Park et al. |
| 5,751,388 A | 5/1998 | Larson |
| 5,753,362 A | 5/1998 | Kawase et al. |
| 5,793,456 A | 8/1998 | Broer et al. |
| 5,825,543 A | 10/1998 | Ouderkirk et al. |
| 5,867,316 A | 2/1999 | Carlson et al. |
| 5,882,774 A | 3/1999 | Jonza et al. |
| 5,914,560 A | 6/1999 | Winsor |
| 6,042,945 A | 3/2000 | Maekawa |
| 6,057,961 A | 5/2000 | Allen et al. |
| 6,080,467 A | 6/2000 | Weber et al. |
| 6,111,696 A | 8/2000 | Allen et al. |
| 6,111,697 A | 8/2000 | Merrill et al. |
| 6,122,103 A | 9/2000 | Perkins et al. |
| 6,153,289 A | 11/2000 | Murray |
| 6,163,351 A | 12/2000 | Nakayama |
| 6,282,821 B1 | 9/2001 | Freier et al. |
| 6,288,172 B1 | 9/2001 | Goetz et al. |
| 6,297,906 B1 | 10/2001 | Allen et al. |
| 6,307,676 B1 | 10/2001 | Merrill et al. |
| 6,341,879 B1 | 1/2002 | Skinner et al. |
| 6,343,865 B1 | 2/2002 | Suzuki |
| 6,352,761 B1 | 3/2002 | Hebrink et al. |
| 6,359,670 B1 | 3/2002 | Broer |
| 6,368,699 B1 | 4/2002 | Gilbert et al. |
| 6,416,910 B1 | 7/2002 | Limura et al. |
| 6,448,339 B1 | 9/2002 | Tomita |
| 6,597,418 B2 | 7/2003 | Moon et al. |
| 6,613,619 B2 | 9/2003 | Yamazaki et al. |
| 6,627,300 B1 | 9/2003 | Kent |
| 6,636,363 B2 | 10/2003 | Kaminsky et al. |
| 6,692,137 B2 | 2/2004 | Bianchard |
| 6,706,339 B1 | 3/2004 | Miyatake et al. |
| 6,723,392 B1 | 4/2004 | Jinnal et al. |
| 6,723,772 B2 | 4/2004 | Maekawa |
| 6,744,480 B2 * | 6/2004 | Kaneko ............... 349/65 |
| 6,760,157 B1 | 7/2004 | Allen et al. |
| 6,771,335 B2 | 8/2004 | Kimura et al. |
| 6,783,850 B2 | 8/2004 | Takizawa et al. |
| 6,809,782 B1 | 10/2004 | Kawamoto et al. |
| 6,827,886 B2 | 12/2004 | Neavin et al. |
| 6,831,714 B2 | 12/2004 | Masaki et al. |
| 6,846,089 B2 | 1/2005 | Stevenson et al. |
| 6,861,121 B2 | 3/2005 | Marsunaga et al. |
| 6,992,822 B2 | 1/2006 | Ma et al. |
| 7,010,212 B2 | 3/2006 | Emmons |
| 7,072,096 B2 | 7/2006 | Holman et al. |
| 7,106,395 B2 * | 9/2006 | Maeda ............... 349/65 |
| 7,232,594 B2 | 6/2007 | Miroshin et al. |
| 7,436,469 B2 | 10/2008 | Gehlsen |
| 7,446,827 B2 | 11/2008 | Ko et al. |
| 7,710,511 B2 | 5/2010 | Gehlsen |
| 2001/0008681 A1 | 7/2001 | Savant |
| 2001/0033349 A1 | 10/2001 | Honda et al. |
| 2001/0036546 A1 | 11/2001 | Kaytor et al. |
| 2002/0149712 A1 | 10/2002 | Kitamura |
| 2002/0159019 A1 | 10/2002 | Pokorny et al. |
| 2002/0167629 A1 | 11/2002 | Blanchard |
| 2002/0190406 A1 | 12/2002 | Merrill et al. |
| 2003/0017281 A1 | 1/2003 | Mizutani et al. |
| 2003/0118805 A1 | 6/2003 | Kretman et al. |
| 2003/0147042 A1 | 8/2003 | Kawamoto et al. |
| 2003/0164914 A1 | 9/2003 | Weber et al. |
| 2003/0192638 A1 | 10/2003 | Yang et al. |
| 2003/0214632 A1 | 11/2003 | Ma |
| 2003/0223216 A1 | 12/2003 | Emmons et al. |
| 2004/0061812 A1 | 4/2004 | Maeda |
| 2004/0067338 A1 | 4/2004 | Kaminsky et al. |
| 2004/0099992 A1 | 5/2004 | Merrill et al. |
| 2004/0099993 A1 | 5/2004 | Jackson et al. |
| 2004/0141103 A1 | 7/2004 | Kotchick |
| 2004/0202879 A1 | 10/2004 | Xia et al. |
| 2004/0229059 A1 | 11/2004 | Kausch et al. |
| 2004/0246697 A1 | 12/2004 | Yamashita et al. |
| 2005/0024558 A1 | 2/2005 | Toyooka |
| 2005/0046767 A1 | 3/2005 | Freking et al. |
| 2005/0140843 A1 | 6/2005 | Shimizu |
| 2005/0195588 A1 | 9/2005 | Kang et al. |
| 2006/0029784 A1 | 2/2006 | Doan et al. |
| 2006/0033860 A1 | 2/2006 | Okishiro et al. |
| 2006/0291055 A1 | 12/2006 | Gehlsen |
| 2007/0134438 A1 | 6/2007 | Fabick |
| 2010/0188754 A1 | 7/2010 | Gehlsen |

FOREIGN PATENT DOCUMENTS

| | | |
|---|---|---|
| CN | 1653386 | 8/2005 |
| CN | 1656395 | 8/2005 |
| EP | 881510 | 12/1998 |
| EP | 1553440 | 7/2005 |
| JP | 6-347764 | 12/1994 |
| JP | 10-048430 | 2/1998 |
| JP | 11-258411 | 9/1999 |
| JP | 15172931 | 6/2003 |
| JP | 2003-249101 | 9/2003 |
| JP | 2003-337337 | 11/2003 |
| JP | 16029694 | 1/2004 |
| JP | 2004/045472 | 2/2004 |
| JP | 2004-219926 | 8/2004 |
| WO | WO 84/03837 | 10/1984 |
| WO | WO 96/31794 | 10/1996 |
| WO | WO 97/23577 | 7/1997 |
| WO | WO 99/36262 | 7/1999 |
| WO | WO 99/56158 | 11/1999 |
| WO | WO 01/47711 | 7/2001 |
| WO | WO 03/034104 | 4/2003 |
| WO | WO 03/064526 | 8/2003 |
| WO | WO 03/102642 | 12/2003 |
| WO | WO 2004/008236 | 1/2004 |
| WO | WO 2004/074909 | 9/2004 |
| WO | WO 2004/094549 A1 | 11/2004 |
| WO | WO 2004/111692 | 12/2004 |
| WO | WO 2005/024473 | 3/2005 |

* cited by examiner

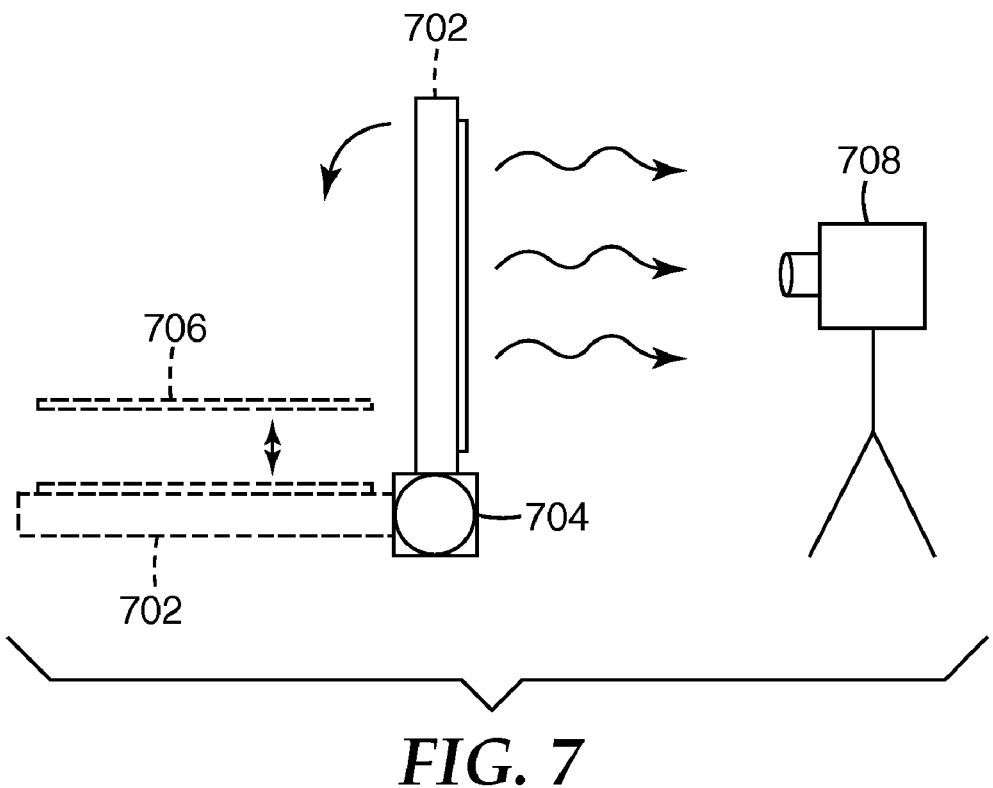
*FIG. 7*
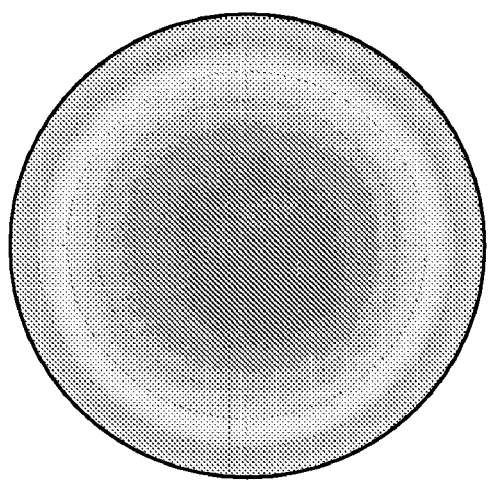 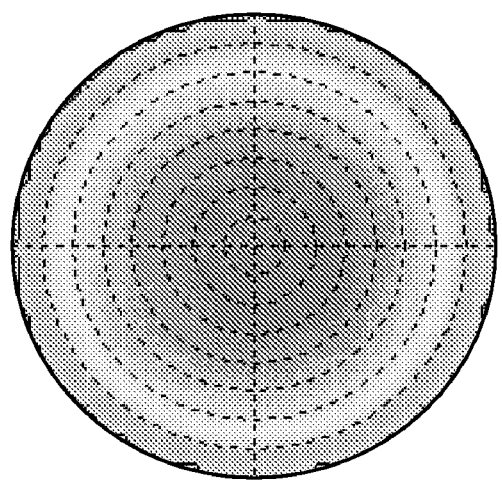
*FIG. 14A*  *FIG. 14B*

DIRECT-LIT LIQUID CRYSTAL DISPLAYS WITH LAMINATED DIFFUSER PLATES

RELATED PATENT APPLICATIONS

This application is a divisional of U.S. patent application Ser. No. 10/966,610, filed Oct. 15, 2004, now U.S. Pat. No. 7,446,827 now allowed, the disclosure of which is incorporated by reference in its entirety herein.

This application is related to U.S. patent application Ser. No. 11/244,666, filed on Oct. 6, 2005, which is a continuation-in-part of U.S. patent application Ser. No. 10/966,610, filed Oct. 15, 2004, now allowed, the disclosure of which is incorporated by reference in its entirety herein.

FIELD OF THE INVENTION

The invention relates to optical displays, and more particularly to liquid crystal displays (LCDs) that are directly illuminated by light sources from behind, such as may be used in LCD monitors and LCD televisions.

BACKGROUND

Liquid crystal displays (LCDs) are optical displays used in devices such as laptop computers, hand-held calculators, digital watches and televisions. Some LCDs include a light source that is located to the side of the display, with a light guide positioned to guide the light from the light source to the back of the LCD panel. Other LCDs, for example some LCD monitors and LCD televisions (LCD-TVs), are directly illuminated using a number of light sources positioned behind the LCD panel. This arrangement is increasingly common with larger displays, because the light power requirements, to achieve a certain level of display brightness, increase with the square of the display size, whereas the available real estate for locating light sources along the side of the display only increases linearly with display size. In addition, some LCD applications, such as LCD-TVs, require that the display be bright enough to be viewed from a greater distance than other applications, and the viewing angle requirements for LCD-TVs are generally different from those for LCD monitors and hand-held devices.

Some LCD monitors and most LCD-TVs are commonly illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is used to smooth the illumination profile at the back of the LCD device.

Currently, LCD-TV diffuser plates employ a polymeric matrix of polymethyl methacrylate (PMMA) with a variety of dispersed phases that include glass, polystyrene beads, and $CaCO_3$ particles. These plates often deform or warp after exposure to the elevated temperatures of the lamps. In addition, some diffusion plates are provided with a diffusion characteristic that varies spatially across its width, in an attempt to make the illumination profile at the back of the LCD panel more uniform. Such non-uniform diffusers are sometimes referred to as printed pattern diffusers. They are expensive to manufacture, and increase manufacturing costs, since the diffusing pattern must be registered to the illumination source at the time of assembly. In addition, the diffusion plates require customized extrusion compounding to distribute the diffusing particles uniformly throughout the polymer matrix, which further increases costs.

SUMMARY OF THE INVENTION

One embodiment of the invention is directed to a directly illuminated liquid crystal display (LCD) unit that includes a light source and an LCD panel. An arrangement of light management layers is disposed between the one or more light sources and the LCD panel so that the light source illuminates the LCD panel through the arrangement of light management films. The arrangement of light management layers comprises a diffuser plate, a brightness enhancing layer and a reflective polarizer. The diffuser plate is positioned closer to the light source than the brightness enhancing film and the reflective polarizer. The diffuser plate comprises a substantially transparent substrate attached to a first diffusing layer that diffuses light propagating from the one or more light sources towards the LCD panel.

Another embodiment of the invention is directed to a directly illuminated liquid crystal display (LCD) unit that includes a light source and an LCD panel. An arrangement of light management layers is disposed between the light sources and the LCD panel so that the light source illuminates the LCD panel through the arrangement of light management layers. The arrangement of light management layers comprises at least one diffuser layer and a brightness enhancing layer. A single pass transmission through the diffuser layer is greater than about 75%.

Another embodiment of the invention is directed to a directly illuminated liquid crystal display (LCD) unit that includes an LCD panel and a flat fluorescent light source having an upper surface. The flat fluorescent light source is capable of emitting light through its upper surface. An arrangement of light management layers is disposed between the flat fluorescent light source and the LCD panel. The arrangement of light management layers comprises at least a first diffuser layer and a brightness enhancing layer. At least one of the light management layers is attached to the upper surface of the flat fluorescent light source.

Another embodiment of the invention is directed to a directly illuminated liquid crystal display (LCD) unit that includes a light source and an LCD panel comprising an upper plate, a lower plate and a liquid crystal layer disposed between the upper and lower plates. The lower plate faces the one or more light sources and comprises an absorbing polarizer. An arrangement of light management layers is disposed between the light source and the LCD panel so that the light source illuminates the LCD panel through the arrangement of light management layers. The arrangement of light management layers comprises at least a first diffuser layer, a brightness enhancing layer and a reflective polarizer. At least one of the light management layers is attached to a lower surface of the lower plate of the LCD panel.

Another embodiment of the invention is directed to a directly illuminated liquid crystal display (LCD) unit that includes a light source and an LCD panel. An arrangement of light management layers is disposed between the light source and the LCD panel so that the light source illuminates the LCD panel through the arrangement of light management layers. The arrangement of light management layers comprises a diffuser plate and at least one of a brightness enhancing layer and a reflective polarizer. The diffuser plate comprises a substantially transparent substrate attached to a first diffusing layer that diffuses light propagating from the light source towards the LCD panel.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 7 schematically illustrates an experimental set up used for optically testing sample diffuser plates;

FIGS. 14A and 14B respectively present conoscopic plots for sample S28 and control sample C3;

DETAILED DESCRIPTION

The present invention is applicable to liquid crystal displays (LCDs, or LC displays), and is particularly applicable to LCDs that are directly illuminated from behind, for example as are used in LCD monitors and LCD televisions (LCD-TVs).

The diffuser plates currently used in LCD-TVs are based on a polymeric matrix, for example polymethyl methacrylate (PMMA), polycarbonate (PC), or cyclo-olefins, formed as a rigid sheet. The sheet contains diffusing particles, for example, organic particles, inorganic particles or voids (bubbles). These plates often deform or warp after exposure to the elevated temperatures of the light sources used to illuminate the display. These plates also are more expensive to manufacture and to assemble in the final display device.

The invention is directed to a directly illuminated LCD device that has an arrangement of light management layers positioned between the LCD panel itself and the light source. The arrangement of light management layers includes a diffuser plate having a rigid organic or inorganic substrate and a polymeric volume diffusing sheet possessing a specific transmission and haze level directly adjacent to one side of the substrate. Another polymeric volume diffusing sheet may be positioned on the other side of the substrate. The transmission and haze levels of each component are designed to provide a direct-lit LC display whose brightness is relatively uniform across the display.

Diffuser plates of the present invention are simple to manufacture and provide a high degree of flexibility in the materials and processes used in manufacturing. In the diffuser plate according to the present invention, the structural and optical requirements are separated: the substrate provides the structural performance and the attached diffusing layer, or layers, provides the optical performance. By separating these functions, the cost advantages of using common transparent materials and common diffuser sheets can be exploited, to reduce overall costs. This also permits the introduction of warp resistant plates, for example glass plates, at low cost. In addition, it is easier to control the diffusion properties more precisely when the diffuser is contained in a layer separate from the plate. Patterned diffuser films may also be applied with less expense than with patterned, rigid, bulk diffuser plates.

Figure 1:
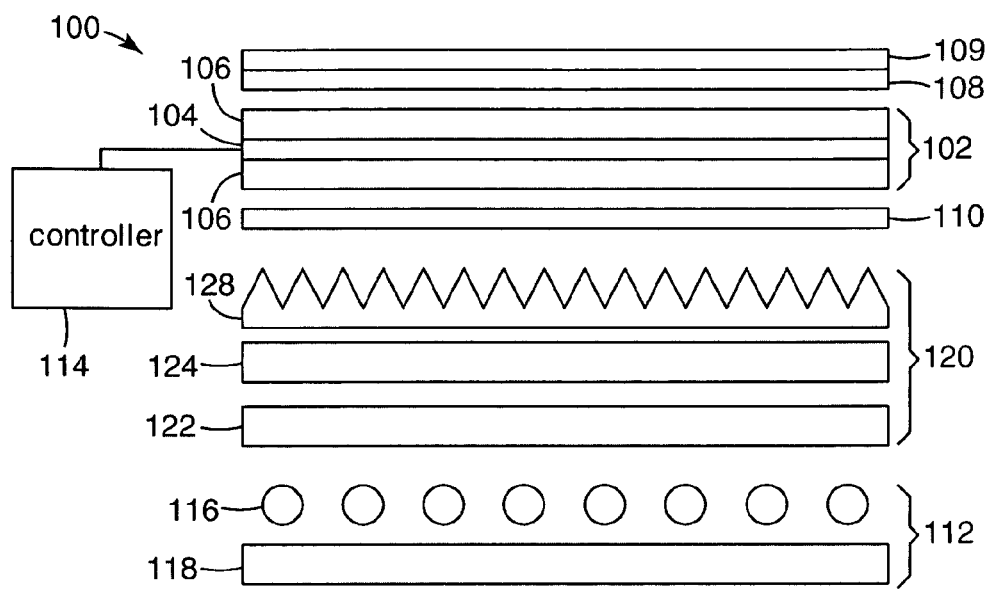
FIG. 1 schematically illustrates a back-lit liquid crystal display device that is capable of using a diffuser plate according to principles of the present invention.

A schematic exploded view of an exemplary embodiment of a direct-lit LC display device 100 is presented in FIG. 1.

Such a display device 100 may be used, for example, in an LCD monitor or LCD-TV. The display device 100 is based on the use of an LC panel 102, which typically comprises a layer of LC 104 disposed between panel plates 106. The plates 106 are often formed of glass, and may include electrode structures and alignment layers on their inner surfaces for controlling the orientation of the liquid crystals in the LC layer 104. The electrode structures are commonly arranged so as to define LC panel pixels, areas of the LC layer where the orientation of the liquid crystals can be controlled independently of adjacent areas. A color filter may also be included with one or more of the plates 106 for imposing color on the image displayed.

An upper absorbing polarizer 108 is positioned above the LC layer 104 and a lower absorbing polarizer 110 is positioned below the LC layer 104. In the illustrated embodiment, the upper and lower absorbing polarizers are located outside the LC panel 102. The absorbing polarizers 108, 110 and the LC panel 102 in combination control the transmission of light from the backlight 112 through the display 100 to the viewer. In some LC displays, the absorbing polarizers 108, 110 may be arranged with their transmission axes perpendicular. When a pixel of the LC layer 104 is not activated, it may not change the polarization of light passing therethrough. Accordingly, light that passes through the lower absorbing polarizer 110 is absorbed by the upper absorbing polarizer 108, when the absorbing polarizers 108, 110 are aligned perpendicularly. When the pixel is activated, on the other hand, the polarization of the light passing therethrough is rotated, so that at least some of the light that is transmitted through the lower absorbing polarizer 110 is also transmitted through the upper absorbing polarizer 108. Selective activation of the different pixels of the LC layer 104, for example by a controller 114, results in the light passing out of the display at certain desired locations, thus forming an image seen by the viewer. The controller may include, for example, a computer or a television controller that receives and displays television images. One or more optional layers 109 may be provided over the upper absorbing polarizer 108, for example to provide mechanical and/or environmental protection to the display surface. In one exemplary embodiment, the layer 109 may include a hardcoat over the absorbing polarizer 108.

It will be appreciated that some type of LC displays may operate in a manner different from that described above. For example, the absorbing polarizers may be aligned parallel and the LC panel may rotate the polarization of the light when in an unactivated state. Regardless, the basic structure of such displays remains similar to that described above.

The backlight 112 includes a number of light sources 116 that generate the light that illuminates the LC panel 102. The light sources 116 used in a LCD-TV or LCD monitor are often linear, cold cathode, fluorescent tubes that extend across the display device 100. Other types of light sources may be used, however, such as filament or arc lamps, light emitting diodes (LEDs), flat fluorescent panels or external fluorescent lamps. This list of light sources is not intended to be limiting or exhaustive, but only exemplary.

The backlight 112 may also include a reflector 118 for reflecting light propagating downwards from the light sources 116, in a direction away from the LC panel 102. The reflector 118 may also be useful for recycling light within the display device 100, as is explained below. The reflector 118 may be a specular reflector or may be a diffuse reflector. One example of a specular reflector that may be used as the reflector 118 is Vikuiti™ Enhanced Specular Reflection (ESR) film available from 3M Company, St. Paul, Minn. Examples of suitable diffuse reflectors include polymers, such as polyethylene terephthalate (PET), polycarbonate (PC), polypropylene, polystyrene and the like, loaded with diffusely reflective particles, such as titanium dioxide, barium sulphate, calcium carbonate and the like. Other examples of diffuse reflectors, including microporous materials and fibril-containing materials, are discussed in co-owned U.S. Patent Application Publication 2003/0118805 A1, incorporated herein by reference.

An arrangement 120 of light management layers is positioned between the backlight 112 and the LC panel 102. The light management layers affect the light propagating from backlight 112 so as to improve the operation of the display device 100. For example, the arrangement 120 of light management layers may include a diffuser plate 122. The diffuser plate 122 is used to diffuse the light received from the light sources, which results in an increase in the uniformity of the illumination light incident on the LC panel 102. Consequently, this results in an image perceived by the viewer that is more uniformly bright.

The arrangement 120 of light management layers may also include a reflective polarizer 124. The light sources 116 typically produce unpolarized light but the lower absorbing polarizer 110 only transmits a single polarization state, and so about half of the light generated by the light sources 116 is not transmitted through to the LC layer 104. The reflecting polarizer 124, however, may be used to reflect the light that would otherwise be absorbed in the lower absorbing polarizer, and so this light may be recycled by reflection between the reflecting polarizer 124 and the reflector 118. At least some of the light reflected by the reflecting polarizer 124 may be depolarized, and subsequently returned to the reflecting polarizer 124 in a polarization state that is transmitted through the reflecting polarizer 124 and the lower absorbing polarizer 110 to the LC layer 104. In this manner, the reflecting polarizer 124 may be used to increase the fraction of light emitted by the light sources 116 that reaches the LC layer 104, and so the image produced by the display device 100 is brighter.

Any suitable type of reflective polarizer may be used, for example, multilayer optical film (MOF) reflective polarizers; diffusely reflective polarizing film (DRPF), such as continuous/disperse phase polarizers, wire grid reflective polarizers or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference. Commercially available examples of MOF reflective polarizers include Vikuiti™ DBEF-D200 and DBEF-D440 multilayer reflective polarizers that include diffusive surfaces, available from 3M Company, St. Paul, Minn.

Examples of DRPF useful in connection with the present invention include continuous/disperse phase reflective polarizers as described in co-owned U.S. Pat. No. 5,825,543, incorporated herein by reference, and diffusely reflecting multi-layer polarizers as described in e.g. co-owned U.S. Pat. No. 5,867,316, also incorporated herein by reference. Other suitable types of DRPF are described in U.S. Pat. No. 5,751,388.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizer useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

The arrangement 120 of light management layers may also include a brightness enhancing layer 128. A brightness enhancing layer is one that includes a surface structure that redirects off-axis light in a direction closer to the axis of the display. This increases the amount of light propagating on-axis through the LC layer 104, thus increasing the brightness of the image seen by the viewer. One example is a prismatic brightness enhancing layer, which has a number of prismatic ridges that redirect the illumination light, through refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT.

Figure 2A:
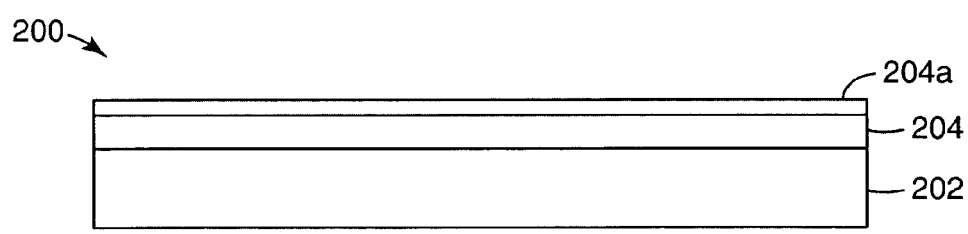
FIGS. 2A and 2B schematically illustrate embodiments of single sided diffuser plates according to principles of the present invention.

Unlike conventional diffuser plates used in LCD-TVs, a diffuser plate according to an embodiment of the present invention has separate structural and diffusing members. One exemplary embodiment of a diffuser plate 200 is schematically illustrated in FIG. 2A. The diffuser plate 200 includes a substrate 202 and a diffuser layer 204 attached to the substrate.

The substrate 202 is a sheet of material that is self-supporting, and is used to provide support to the layers to which it is attached. While each of the layers in a laminate contributes to the stiffness of the laminate, the substrate is the layer that contributes most to the stiffness, i.e. provides more resistance to bending than any of the other layers of the laminate. A substrate does not significantly deform under its own weight, although it may sag to a certain extent. The substrate 202 may be, for example, up to a few mm thick, depending on the size of the display. In one exemplary embodiment, a 30" LCD-TV has a 2 mm thick bulk diffuser plate. In another exemplary embodiment, a 40" LCD-TV has a 3 mm thick bulk diffuser plate.

The substrate 202 may be made of any material that is substantially transparent to visible light, for example, organic or inorganic materials, including glasses and polymers. Suitable glasses include float glasses, i.e. glasses made using a float process, or LCD quality glasses, referred as LCD glass, whose characteristic properties, such as thickness and purity, are better controlled than float glass. One approach to forming LCD glass is to form the glass between rollers.

The diffuser plate and one or more other light management layers may be included in a light management unit disposed between the backlight and the LCD panel. The light management unit provides a stable structure for holding the diffuser plate and the one or other light management layers. The structure is less prone to warping than conventional diffuser plates, particularly if the supporting substrate is formed of a warp-resistant material such as glass. Also, the ability to supply a display manufacturer with a diffuser plate attached together with one or more other light management layers as a single integrated unit results in simplified assembly of the display.

Suitable polymer materials may be amorphous or semi-crystalline, and may include homopolymer, copolymer or blends thereof. Polymer foams may also be used. Example polymer materials include, but are not limited to, amorphous polymers such as poly(carbonate) (PC); poly(styrene) (PS); acrylates, for example acrylic sheets as supplied under the ACRYLITE® brand by Cyro Industries, Rockaway, N.J.; acrylic copolymers such as isooctyl acrylate/acrylic acid; poly(methylmethacrylate) (PMMA); PMMA copolymers; cycloolefins; cylcoolefin copolymers; acrylonitrile butadiene styrene (ABS); styrene acrylonitrile copolymers (SAN); epoxies; poly(vinylcyclohexane); PMMA/poly(vinylfluoride) blends; atactic poly(propylene); poly(phenylene oxide) alloys; styrenic block copolymers; polyimide; polysulfone; poly(vinyl chloride); poly(dimethyl siloxane) (PDMS); polyurethanes; poly(carbonate)/aliphatic PET blends; and semicrystalline polymers such as poly(ethylene); poly(propylene); poly(ethylene terephthalate) (PET); poly(ethylene naphthalate)(PEN); polyamide; ionomers; vinyl acetate/polyethylene copolymers; cellulose acetate; cellulose acetate butyrate; fluoropolymers; poly(styrene)-poly(ethylene) copolymers; and PET and PEN copolymers.

One or both sides of the substrate 202 may be provided with a matte finish.

Exemplary embodiments of the diffusing layer 204 include a polymer matrix containing diffusing particles. The polymer matrix may be any suitable type of polymer that is substantially transparent to visible light, for example any of the polymer materials listed above.

The diffusing particles may be any type of particle useful for diffusing light, for example transparent particles whose refractive index is different from the surrounding polymer matrix, diffusely reflective particles, or voids or bubbles in the matrix. Examples of suitable transparent particles include solid or hollow inorganic particles, for example glass beads or glass shells, solid or hollow polymeric particles, for example solid polymeric spheres or polymeric hollow shells. Examples of suitable diffusely reflecting particles include particles of titanium dioxide ($TiO_2$), calcium carbonate ($CaCO_3$), barium sulphate ($BaSO_4$), magnesium sulphate ($MgSO_4$) and the like. In addition, voids in the polymer matrix may be used for diffusing the light. Such voids may be filled with a gas, for example air or carbon dioxide. Commercially available materials suitable for use in a diffusing layer include 3M™ Scotchcal™ Diffuser Film, type 3635-70 and 3635-30, and 3M™ Scotchcal™ ElectroCut™ Graphic Film, type 7725-314, available from 3M Company, St. Paul, Minn. Other commercially available diffusers include acrylic foam tapes, such as 3M™ VHB™ Acrylic Foam Tape No. 4920.

Figure 2B:
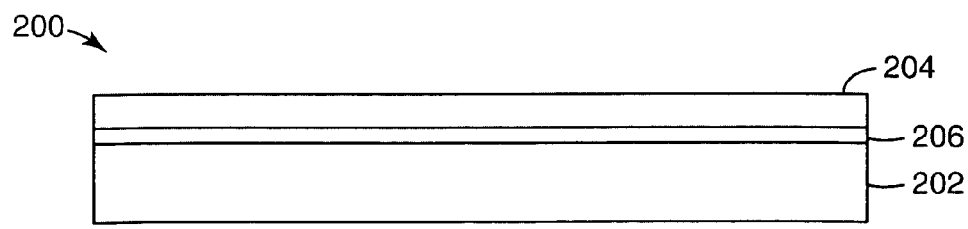

The diffuser layer 204 may be applied directly to the surface of the substrate 202, for example where the polymer matrix of the diffuser layer 204 is an adhesive. In other exemplary embodiments, the diffuser layer 204 may be attached to the surface of the substrate 202 using an adhesive layer 206, as is schematically illustrated in FIG. 2B. In some exemplary embodiments, the diffuser layer 204 has a diffusion characteristic that is uniform across its width, in other words the amount of diffusion experienced by light is the same for points across the width of the diffuser layer.

The diffuser layer 204 may optionally be supplemented with an additional patterned diffuser 204a. The patterned diffuser 204a may include, for example, a patterned diffusing surface or a printed layer of diffuser, such as particles of titanium dioxide ($TiO_2$). The patterned diffuser 204a may lie on the substrate 202, between the diffuser layer 204 and the substrate 202, or above the diffuser layer 204. The patterned layer 204a may be, for example, printed onto the diffuser layer 204, as illustrated in FIG. 2A, or onto a sheet that lies above the diffuser layer 204.

The diffuser plate may be provided with protection from ultraviolet (UV) light, for example by including UV absorbing material or material in one of the layers that is resistant to the effects of UV light. In particular, one of the layers of the diffuser plate, such as the substrate 202, may include a UV absorbing material, or the diffuser plate may include a separate layer of UV absorbing material. Suitable UV absorbing compounds are available commercially, including, e.g., Cyasorb™ UV-1164, available from Cytec Technology Corporation of Wilmington, Del., and Tinuvin™ 1577, available from Ciba Specialty Chemicals of Tarrytown, N.Y. The diffuser plate may also include brightness enhancing phosphors that convert UV light into visible light.

Other materials may be included in one or more of the layers of the diffuser plate to reduce the adverse effects of UV light. One example of such a material is a hindered amine light stabilizing composition (HALS). Generally, the most useful HALS are those derived from a tetramethyl piperidine, and those that can be considered polymeric tertiary amines. Suitable HALS compositions are available commercially, for example, under the "Tinuvin" tradename from Ciba Specialty Chemicals Corporation of Tarrytown, N.Y. One such useful HALS composition is Tinuvin 622. UV absorbing materials and HALS are further described in co-owned U.S. Pat. No. 6,613,619, incorporated herein by reference.

Figure 3A:
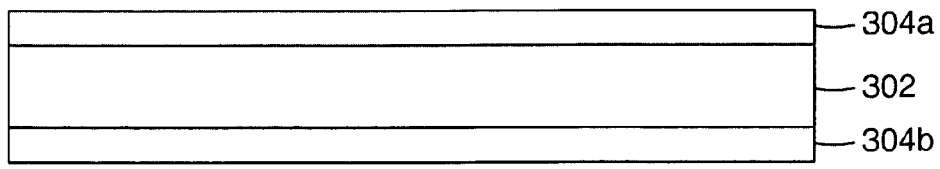
FIGS. 3A and 3B schematically illustrate embodiments of double-sided diffuser plates according to principles of the present invention.
Figure 3B:
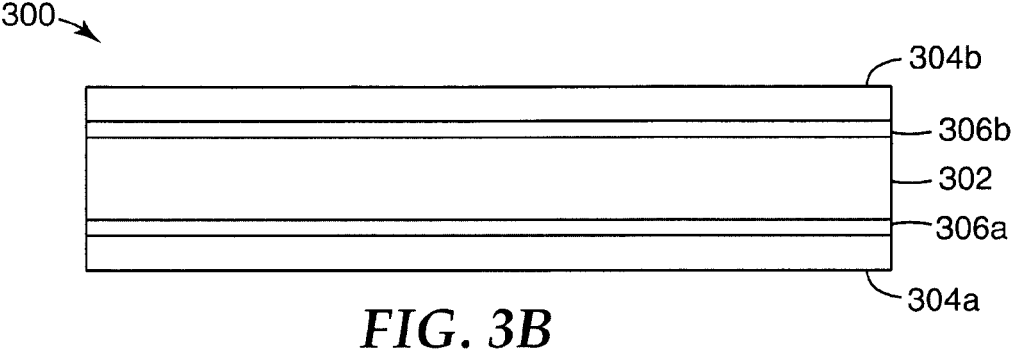

In other exemplary embodiments, the diffuser plate 300 may be double-sided, having a first diffuser layer 304a on one side of the substrate 302 and a second diffuser layer 304b on another side, as is schematically illustrated in FIG. 3A. The diffuser layers 304a and 304b may each be applied directly to the respective surface of the substrate 302, as is illustrated in FIG. 3A, or may be attached using a layer of adhesive 306a, 306b, as is schematically illustrated in FIG. 3B.

The double-sided diffuser plate 300 may be symmetrical, with the two diffuser layers 304a, 304b having the same diffusion properties, or may be asymmetric, with the diffuser layers 304a, 304b having different diffusing properties. For example, the diffuser layer 304a may possess a different transmission or haze level from the second diffuser layer 304b, or may be of a different thickness.

Figure 3C:
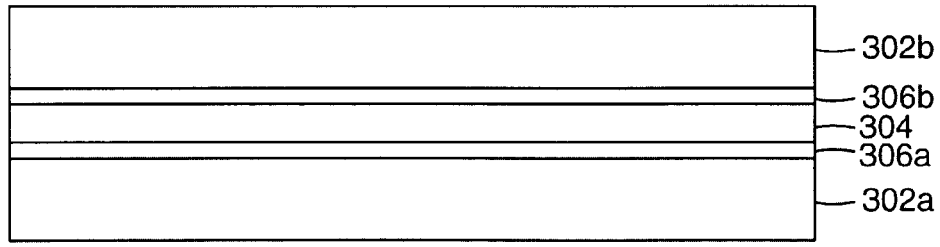
FIGS. 3C and 3D schematically illustrate embodiments of diffuser plates with double substrates, according to principles of the present invention.

In other exemplary embodiments, the diffuser plate may include more than one substrate. One such embodiment is schematically illustrated in FIG. 3C, which shows a diffuser plate 320 formed with first and second substrates 302a and 302b. Other optical layers in the diffuser plate 320 may be positioned symmetrically, with other optical layers positioned between the substrates 302a, 302b, or asymmetrically, with one or more of the other optical layers positioned to the other side of one of the substrates 302a, 302b. In the exemplary embodiment illustrated in FIG. 3C, a diffuser layer 306, is located between the substrates 302a, 302b, and may be attached to the two substrates 302a, 302b via adhesive layers 306a, 306b. In another approach, where the diffuser layer 304 is an adhesive layer, the adhesive layers 306a, 306b may be omitted.

Figure 3D:
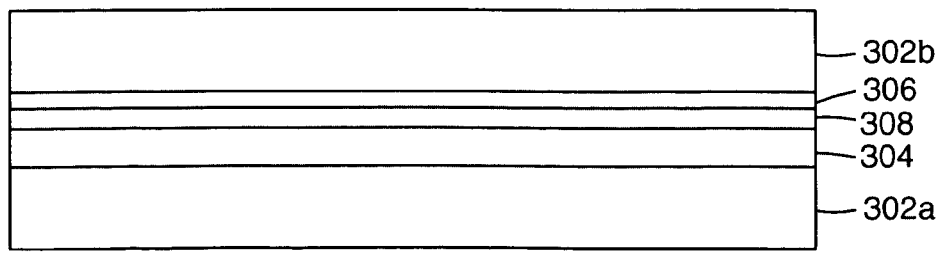

Another exemplary embodiment of diffuser plate 340 is schematically illustrated in FIG. 3D. This diffuser plate 340 includes two substrates 302a, 302b, with a diffuser layer 304 and a reflective polarizer 308 between the substrates 302a, 302b. In this particular embodiment, the diffuser layer 304 is also an adhesive layer, and so the diffuser layer 304 may be used to attached the reflective polarizer 308 to the lower substrate 302a. Another adhesive layer 306 may be positioned between the reflective polarizer 308 and the upper substrate 302b.

Other configurations of diffuser plate having two substrates may also be used. For example, additional optical layers, such as a brightness enhancing layer, may be placed between the substrates, In addition, one of the substrates may comprise a plate of another element of the display. For example, the upper substrate of the diffuser layer may comprise the lower plate of the liquid crystal display panel, or the lower substrate may comprise the plate of a flat fluorescent display. Both of these configurations are described further below.

Figure 4A:
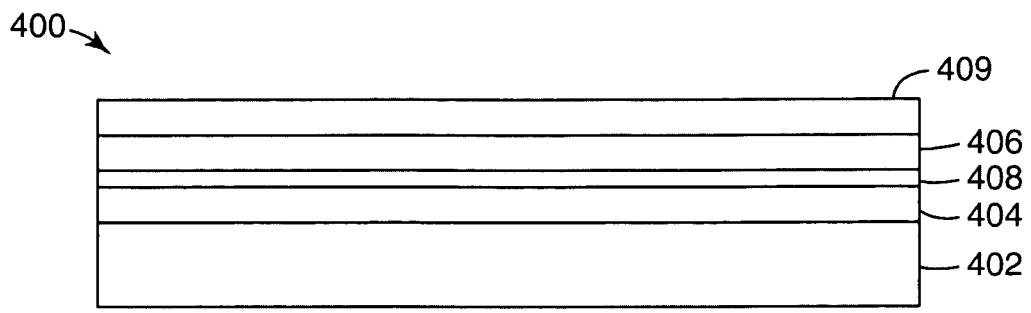
FIGS. 4A-4G schematically illustrate additional embodiments of diffuser plates incorporating additional light management layers, according to principles of the present invention.

Other exemplary embodiments of a diffuser plate may also incorporate additional light management layers. For example, a diffuser plate 400 may include a substrate attached to one side of a diffuser layer 404, with a reflective polarizer 406 attached to the other side of the diffuser layer 404, as is schematically illustrated in FIG. 4A. The reflective polarizer 406 may be attached using an optional layer of adhesive 408, as shown in the illustrated embodiment. Optionally an additional coating 409 may be provided over the reflective polarizer 406. For example, the coating 409 may be a protective hard-coat layer.

In another exemplary embodiment, not illustrated, the diffusing layer 404 and the reflective polarizer 406 may be co-extruded as a combined layer, without the need for a layer of adhesive 408 between the diffuser 404 and the reflective polarizer 406. The combined layer of the diffuser 404 and reflective polarizer 406 may then be mounted to the substrate 402, for example with an adhesive layer.

Figure 4B:
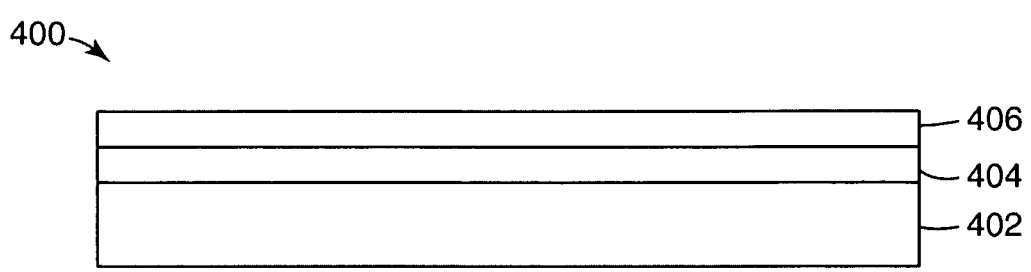

In another exemplary embodiment, the diffuser layer 404 is an adhesive layer, and may be used to mount the reflective polarizer 406 to the substrate 402, as is illustrated in FIG. 4B.

In other embodiments, the diffuser layer 404 may itself comprise a diffuse adhesive layer, in which case the reflective polarizer 406 may be attached directly to the diffuser layer 404. Adhesive diffusive layers are discussed in greater detail in International (PCT) Patent Publications WO99/56158 and WO97/01610, incorporated herein by reference. Adhesive diffusive layers may be used in any of the diffuser plate embodiments discussed herein.

Figure 4C:
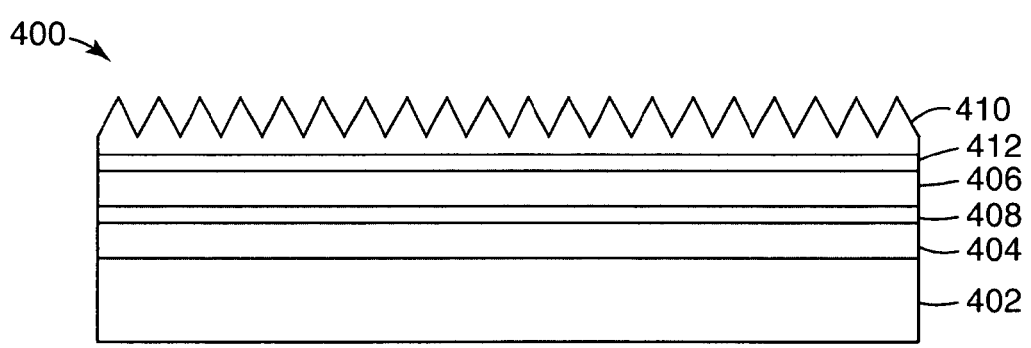

In addition, a brightness enhancing layer 412, such as a prismatic brightness enhancing layer, may optionally be used with the diffuser plate 400. The brightness enhancing layer 410 may be attached to the reflective polarizer 406, as is schematically illustrated in FIG. 4C, for example using via an adhesive layer 412. In other exemplary embodiments, the brightness enhancing layer 410 may not be attached to the reflective polarizer 406, but may be free-standing relative to the diffuser plate 400, with an air gap between the reflective polarizer 406 and the brightness enhancing layer 410.

Figure 4D:
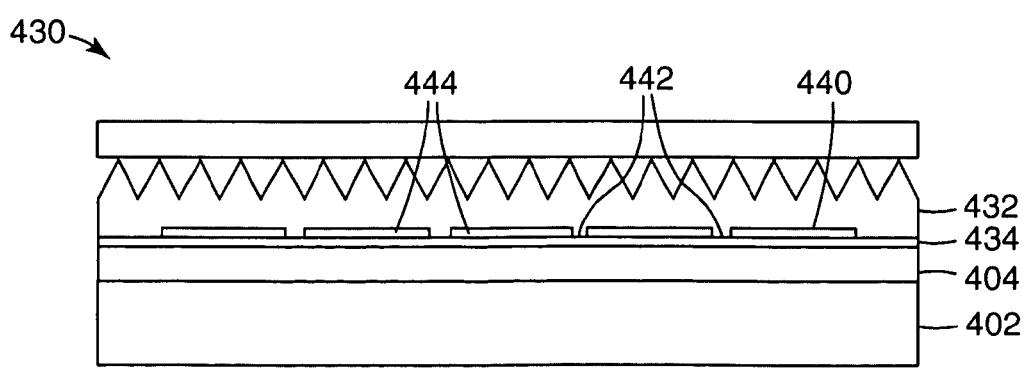

In another exemplary embodiment 430, schematically illustrated in FIG. 4D, a brightness enhancing layer 432 may be attached to the diffuser layer 404. The brightness enhancing layer 432 may be attached directly to the diffuser layer 404, for example if the diffuser layer 404 is adhesive, or may be attached to the diffuser layer 404 using an intermediate layer of adhesive 434.

In some exemplary embodiments, it may be desirable for at least some of the light to enter the brightness enhancing layer 432 through an air interface or an interface having an increased refractive index difference. Therefore, a layer of low index material, for example a fluorinated polymer, may be placed between the brightness enhancing layer and the next layer below the brightness enhancing layer.

In other exemplary embodiments, an air gap may be provided between the brightness enhancing layer 432 and the layer below the brightness enhancing layer. One approach to providing the air gap is to include a structure on one or both of the opposing faces of the brightness enhancing layer 432 and the layer below the brightness enhancing layer. In the illustrated embodiment, the lower surface 440 of the brightness enhancing layer 432 is structured with protrusions 442 that contact the adhesive 434. Voids 444 are thus formed between the protrusions 442, with the result that light entering into the brightness enhancing layer 432 at a position between the protrusions 442 does so through an air interface.

Other approaches to forming voids, and thus providing an air interface to light entering the brightness enhancing layer, may be used. For example, the brightness enhancing layer 432 may have a flat lower surface 440, with the adhesive 434 being structured with protrusions. These, and additional approaches, are discussed in co-owned U.S. Patent Publication No. 2003/0223216 A1, incorporated herein by reference. Any of the embodiments of diffuser plate discussed herein may be adapted to provide an air interface for light entering the brightness enhancing layer.

Optionally, a reflective polarizer layer 436 may be attached to the structured surface of the brightness enhancing layer 432. Attachment of optical films to the structured surface of a brightness enhancing layer is further described in co-owned U.S. patent application Ser. No. 10/439,450, incorporated herein by reference.

Figure 4E:
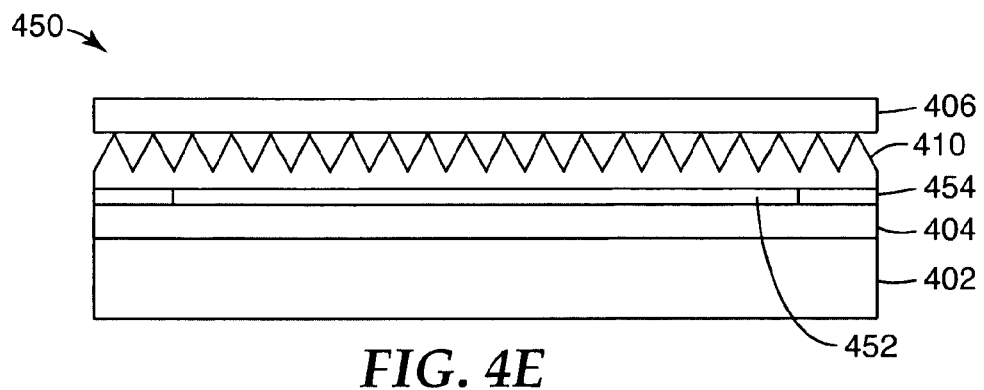

Another exemplary embodiment of a diffuser plate 450 is schematically illustrated in FIG. 4E. In this embodiment, an air gap 452 is formed between the brightness enhancing layer 410 and the layer from which the light passes to the brightness enhancing layer 410, in this case the diffusing layer 404. The air gap 452 may be formed by providing a layer of adhesive 454 between diffusing layer 404 and the brightness enhancing layer 410, around the edge of the plate 450. A reflecting polarizer 406 may optionally be provided above the brightness enhancing layer 410, and may be attached to the brightness enhancing layer 410. In a variation of this embodiment, brightness enhancing layer 410 may be replaced with a reflective polarizer that has a brightness enhancing structure on its upper side.

Figure 4F:
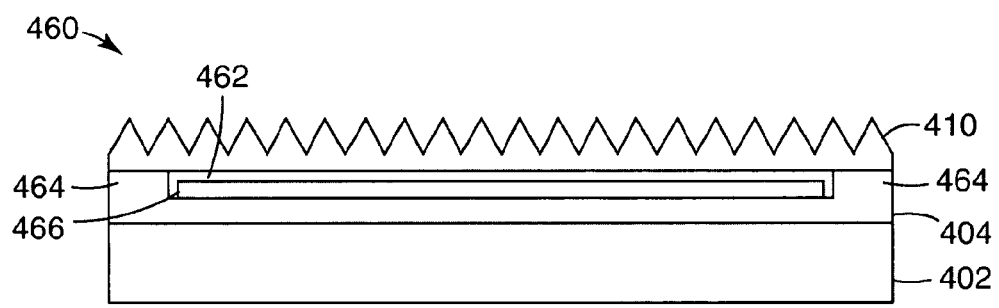

Another exemplary embodiment of a diffuser plate 460 is schematically illustrated in FIG. 4F. In this embodiment, an air gap 462 is formed between the brightness enhancing layer 410 and the diffuser layer 404. The diffuser layer 404 is provided as an adhesive that may be higher at the edges of the diffuser plate 460 than in the central region. The edge portions 464 of the adhesive attach to the brightness enhancing layer 410. An intermediate layer 466 may be provided in the gap 462, for example a blank buffer layer or a reflecting polarizer. In this particular embodiment, the edge portions 464 of the adhesive are higher than the intermediate layer 466.

It is generally preferred, although it is not a limitation, that optical layers placed between the reflective polarizer and the LCD panel, in this and other embodiments, be polarization preserving. This avoids or reduces adverse affects on the polarization of the light that has been polarized by the reflective polarizer. Hence, it would be preferred in this embodiment for the brightness enhancing layer 410 to demonstrate little or no birefringence.

Figure 4G:
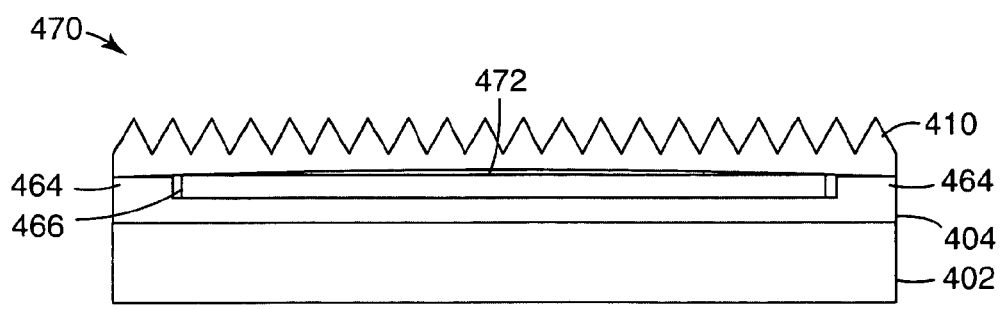

In another exemplary embodiment of diffuser plate 470, schematically illustrated in FIG. 4G, the edge portions 464 are not higher than the intermediate layer 466. Thus, when the brightness enhancing layer 410 is attached to the edge portions 464, the higher intermediate layer 466 bows the brightness enhancing layer 410 out, to produce an air gap 472 between the intermediate layer 466 and the brightness enhancing layer 410.

Figure 5:
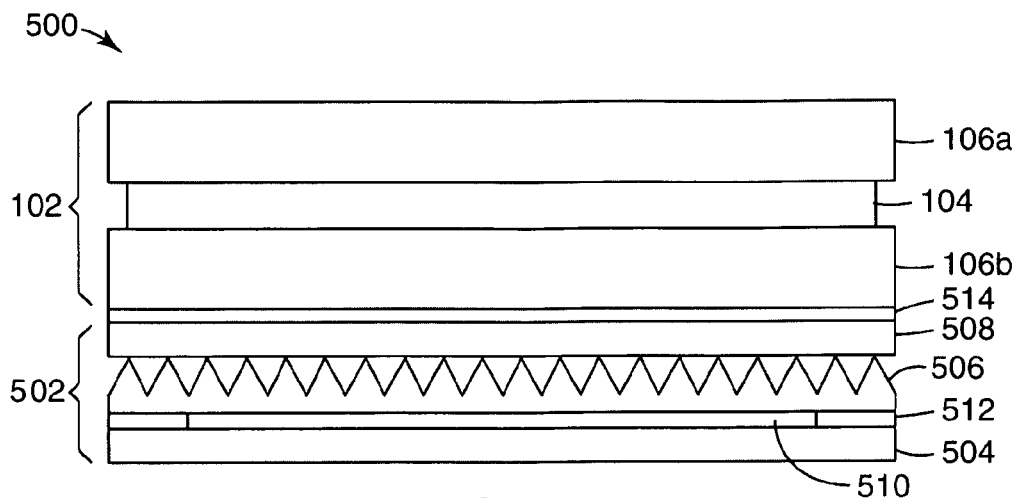
FIG. 5 schematically illustrates an embodiment of a diffuser assembly attached to the lower plate of a liquid crystal panel, according to principles of the present invention.

In some exemplary embodiments, the lower plate of the LCD panel itself may be used as the substrate that supports the diffuser layer and other optical layers. One exemplary embodiment of such a display is schematically illustrated in FIG. 5, in which an LCD panel 102 includes an LC layer 104 and upper and lower plates 106a, 106b. The plates 106a, 106b are typically made of glass, or a thick polymer, and may also include absorbing polarizers. A light management unit 502 is attached to the lower plate 106b. The light management unit 502 includes a diffuser layer 504 and may also include other optical layers. For example, the light management unit 502 may also include a brightness enhancing layer 506 and a reflective polarizer 508. If a brightness enhancing layer is 506 is included, then an air gap 510 may be formed at its lower surface using any of the approaches described above. For example, a layer of adhesive 512 around the edge of the light management unit 502 may be used to provide the air gap 510. The light management unit 502 may be attached to the lower plate 106b using another adhesive layer 514.

Other layers may also be present in the light management unit 502 attached to the LCD panel 102. For example, an additional substrate may be placed within the light management unit 502.

Some fluorescent light sources, referred to herein as a flat fluorescent lamp (FFL), provide a two dimensional plane or surface that may be used for attaching the diffuser layer and other optical layers. These types of light sources are also known by other names, such as flat discharge fluorescent lamp, and two-dimensionally integrated fluorescent lamp (TIFL). Some FFLs are based on a fluorescently converting the UV output from a mercury discharge, while other FFLs use the discharge of some other material. For example, the Planon II lamp, available from Osram GmbH, Munich, Germany, is a two dimensional fluorescent lamp based on a xenon excimer discharge.

Figure 6A:
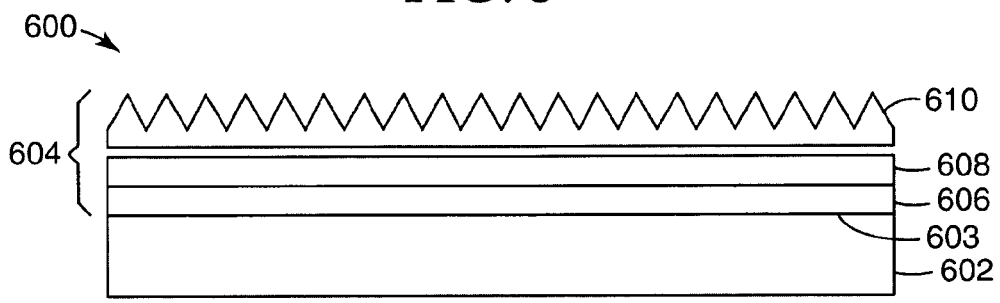
FIGS. 6A-6C schematically illustrate embodiments of diffuser assemblies attached to a flat fluorescent light source, according to principles of the present invention.

One exemplary embodiment of a light management unit 604, comprising a diffuser layer 606 and, optionally, other optical layers, integrated on an FFL 602 is schematically illustrated in FIG. 6A. In this embodiment of integrated light source 600, the FFL 602 has a substantially flat upper surface 603. The light management unit 604 may optionally include other layers, for example, a reflective polarizer 608 and/or a brightness enhancing layer 610, one or more of which are attached to the diffuser layer 606. In the illustrated exemplary embodiment, the reflective polarizer 608 is attached to the diffuser layer 606. The diffuser layer 606 may be an adhesive layer, or an additional adhesive layer (not shown) may be used to attach the reflective polarizer 608 to the diffuser layer 606.

Figure 6B:
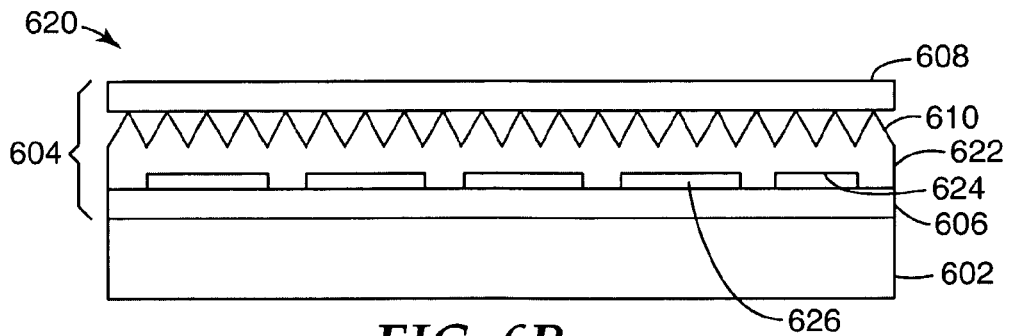

The brightness enhancing layer 610 may be free standing or may be attached to one or two of the other layers in the light management unit 604 using any of the approaches described above. For example, in the exemplary embodiment of integrated light source 620 schematically illustrated in FIG. 6B, the brightness enhancing layer 622 is positioned between the reflective polarizer 608 and the diffuser layer 606, and has a lower surface 624 adapted to provide air gaps 626 diffuser layer 606 and the brightness enhancing layer 622.

Figure 6C:
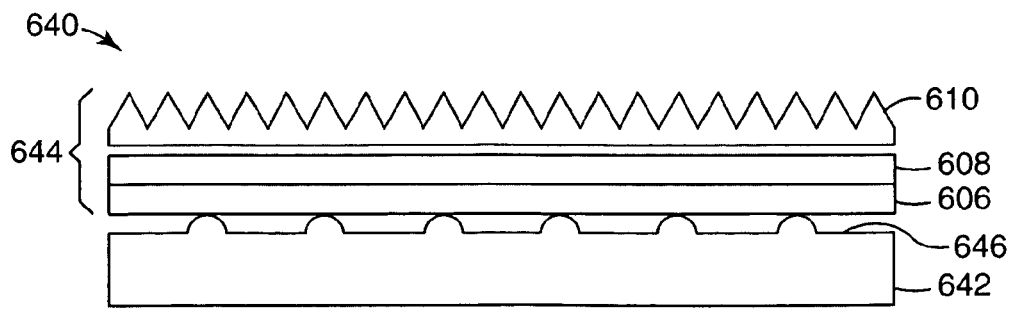

The FFL need not have a flat upper surface. For example, in the embodiment of integrated light source 640 schematically illustrated in FIG. 6C, the light management unit 644 is attached to an FFL 642 that has a ribbed upper surface 646. The diffuser layer 606 may be attached to the ribs of such a surface 646.

EXAMPLES

A number of sample diffuser plates manufactured according to this disclosure were prepared and their performance was compared to that of diffuser plates used in commercially available LCD-TVs. The diffuser plates were tested for single pass light transmission and reflection and for brightness and uniformity.

Light transmission and reflection measurements of the diffuser plates and substrate materials, for samples S1-S27 and control samples C-1 and C2, were made using a BYK Gardner Haze-Gard Plus instrument, catalog no. 4723 and supplied by BYK Gardner, Silver Spring, Md. The transmission and haze levels were collected according to ASTM-D1003-00, titled "Standard Test Method for Haze and Luminous Transmittance for Transparent Plastics". The instrument was referenced against air during the measurements. In all the measurements for transmission and haze, the D1 side of the diffuser plate was positioned on the same side as the clarity port and the D2 side of the diffuser plate faced the haze port.

The measurements of brightness and uniformity, for samples S1-S27 and control samples C1 and C2, were performed on a specially designed LCD-TV experimental test bed. The test bed apparatus 700, illustrated schematically in FIG. 7 used two functioning parts: namely i) a 22" Samsung LCD-TV, Model LTN226W, Model Code: LTN226WX/XAA and shown as element 702 in FIG. 7, and ii) a goniometer stage 704. The goniometer 704 allowed the TV 702 to be moved from a horizontal position, used for film loading and shown in dashed lines, to a vertical position for the measurements. This arrangement provided for convenient for convenient loading and testing of various diffuser panels 706. The LCD-TV 702 was located about ~15 feet (about 4.6 m) from a Prometric CCD Camera, Model 16111 (shown as element 708 in FIG. 7), obtainable from Radiant Imaging, DuVall, Wash.). The camera was provided with a Radiant Imaging Optical Filter, 72 mm ND 2.0. The Prometric camera luminance was calibrated using a Photo Research PR 650 (Chatsworth, Calif., SSN: 60964502). For the measurements reported below, the LC panel and absorbing polarizers had been removed from the LCD-TV, and various diffuser panels were used with the LCD-TV's backlight. The LCD-TV's backlight included an arrangement of eight parallel CCFL lamps.

The data was averaged across one x coordinate and reported as the luminance in nits, while the standard deviation in the brightness across the diffuser plate was collected on the same data to provide a metric on the uniformity.

Figure 8A:
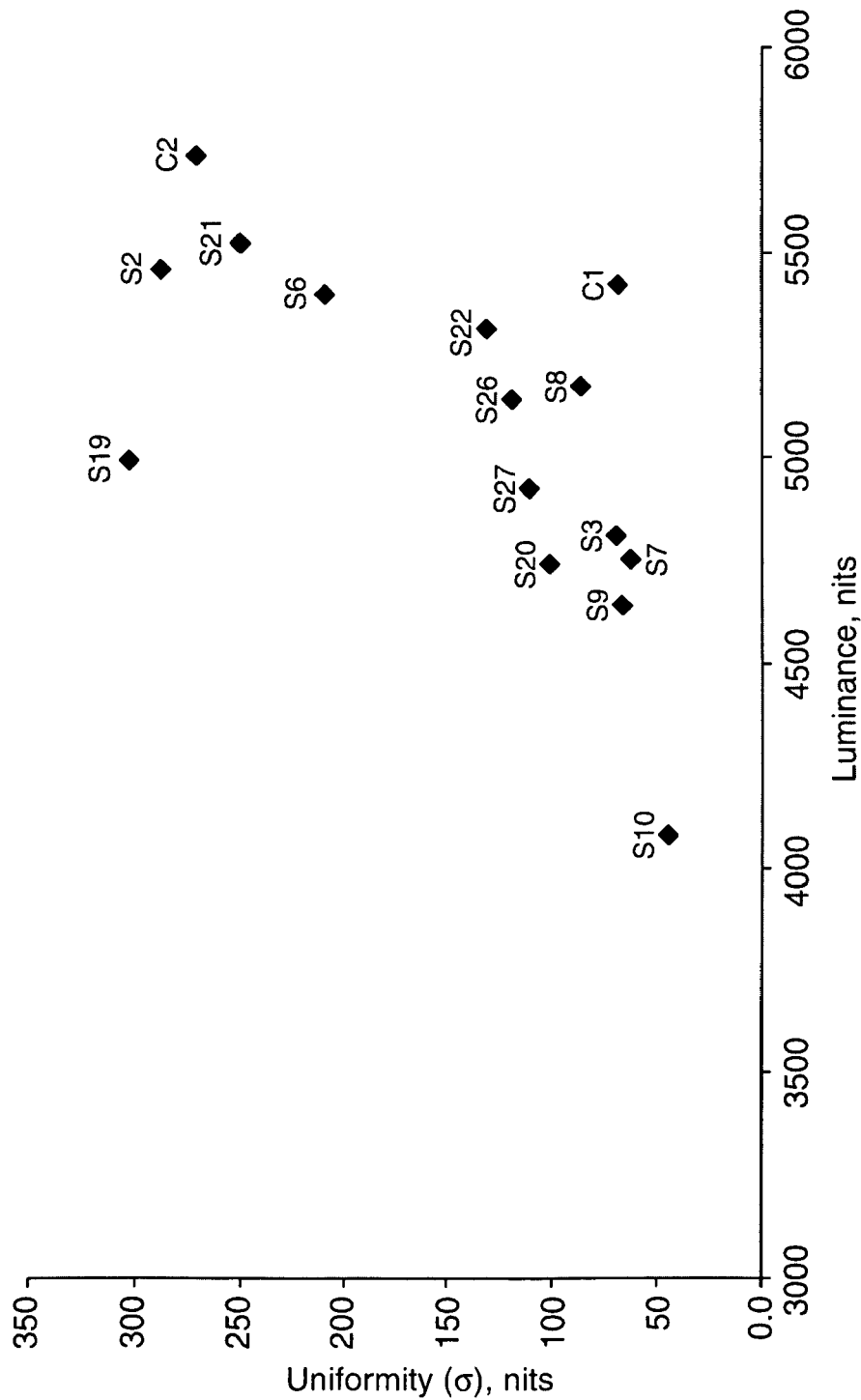
FIG. 8A presents a graph showing brightness uniformity plotted against overall brightness for control samples and example diffuser plates fabricated in accordance with principles of the present invention.

The structural and optical properties of each of the sample diffuser plates and the control samples are summarized in Table I below, and values of brightness uniformity are shown plotted against total brightness in FIG. 8A. In Table I, each row presents the data for a single sample. The control samples, C1 and C2, being listed first.

The "Subst." column shows the type of substrate used. The "Thick" column shows the thickness of the substrate. The "D1" column lists the type of diffuser layer used on the side of the substrate facing away from the lamps. The "D2" column lists the type of diffuser layer used on the side of the substrate facing the lamps. When the substrate was provided with a single diffuser layer, the optical properties were measured with the diffuser layer facing away from the lamps. The "Luminance" column shows the total luminance measured for light transmitted through the diffuser plate, in Nits. The "Uniformity" column lists the standard deviation in the brightness measured across the diffuser plate, also in Nits. The column labeled "a/x" lists the ratio of the uniformity over the luminance, in other words a relative uniformity. The "Transmit" column lists the single pass transmission through the diffuser plate. This is the value of the single pass transmission averaged across the diffuser plate. Where the plate has a uniform diffusion characteristic, the transmission at any one point is equal to the spatially averaged transmission. Where the plate has a non-uniform diffusion characteristic, i.e. as with a printed pattern diffuser, the transmission at any one point need not be the same as the spatially averaged transmission. The "Haze" column lists, as a percentage, the ratio of the diffuse light transmitted through the diffuser plate over the total light transmitted through the diffuser plate.

TABLE I

Summary of Diffuser Plate Samples and Control Examples

| EXAMPLE | Subst. | Thick | D1 | D2 | Luminance Nits | Uniformity Nits | σ/x % | Transmit % | Haze % |
|---|---|---|---|---|---|---|---|---|---|
| C1 | Samsung | 2 mm | n/a | n/a | 5422 | 68 | 1.3 | 56.8 | 103 |
| C2 | Sharp | 2 mm | n/a | n/a | 5740 | 271 | 4.7 | 70.4 | 103 |
| S1 | 1737F | 1 mm | 7725-314 | none | 5363 | 3100 | 57.8 | 92.3 | 82.4 |
| S2 | 1737F | 1 mm | 3635-70 | none | 5461 | 286 | 5.2 | 62 | 101 |
| S3 | 1737F | 1 mm | 3635-30 | none | 4811 | 69 | 1.4 | 38.2 | 102 |
| S5 | 1737F | 1 mm | 7725-314 | 7725-314 | 5638 | 2008 | 35.6 | 86.8 | 96 |
| S6 | 1737F | 1 mm | 7725-314 | 3635-70 | 5399 | 209 | 3.9 | 60.4 | 102 |
| S7 | 1737F | 1 mm | 7725-314 | 3635-30 | 4754 | 63 | 1.3 | 35.8 | 102 |
| S8 | 1737F | 1 mm | 3635-70 | 3635-70 | 5175 | 86 | 1.7 | 50.5 | 102 |
| S9 | 1737F | 1 mm | 3635-70 | 3635-30 | 4639 | 66 | 1.4 | 34.6 | 102 |
| S10 | 1737F | 1 mm | 3635-30 | 3635-30 | 4079 | 44 | 1.1 | 24.7 | 102 |
| S19 | PC | 2 mm | 3635-70 | none | 4996 | 302 | 6.0 | 58.1 | 101 |
| S20 | PC | 2 mm | 3635-70 | 3635-70 | 4740 | 101 | 2.1 | 48.1 | 102 |
| S21 | PMMA | 2 mm | 3635-70 | none | 5524 | 249 | 4.5 | 60.1 | 101 |
| S22 | PMMA | 2 mm | 3635-70 | 3635-70 | 5316 | 131 | 2.5 | 49.9 | 102 |
| S26 | Float | 1 mm | 3635-70 | none | 5139 | 120 | 2.3 | 56.0 | 102 |
| S27 | Float | 1 mm | 3635-70 | 3635-70 | 4924 | 110 | 2.2 | 43.8 | 102 |

Control Sample C1

Control Sample 1 (C1) is the Samsung Patterned Diffuser Plate that accompanied the 22" Samsung LCD-TV (Model: LTN226W). This diffuser plate was a 2 mm thick plate formed of PMMA, and contained $CaCO_3$ diffusing particles. In addition, the plate possesses a printed pattern that is registered to the CCFL bulbs of the Samsung LCD-TV. Control Sample 1 is taken as representing a high performance LCD-TV diffuser plate.

Control Sample C2

Control Sample 2 is the diffuser plate that accompanied a Sharp 30" LCD-TV, model no. LC-30HV2U. This diffuser plate was formed from a 2 mm thick plate of PMMA containing 5 μm glass spheres as the diffusing particles. This diffuser plate did not possess a printed pattern. Control Sample 2 is taken as representing a standard LCD-TV diffuser plate.

Samples S1-S3: Single Sided Diffusers on LCD Glass

Samples S1-S3 were single-sided diffuser laminates based on a 1 mm thick LCD glass substrate (Corning 1737F) and a variety of diffuser films. The glass plates were sized to fit into the Samsung 22" LCD-TV (19.58"×11.18" with 0.1"×1" notches in the middle of both horizontal edges). These samples possessed the same sizes as C-1 and C-2. The glass plates of samples S1-S3 were laminated with 3M Scotchcal™ diffusing films 7725-314, 3635-70, and 3635-30 respectively, all available from 3M Company, St. Paul, Minn. The diffuser films provided a diffusion characteristic that was uniform across the width of the samples.

Figure 8B:
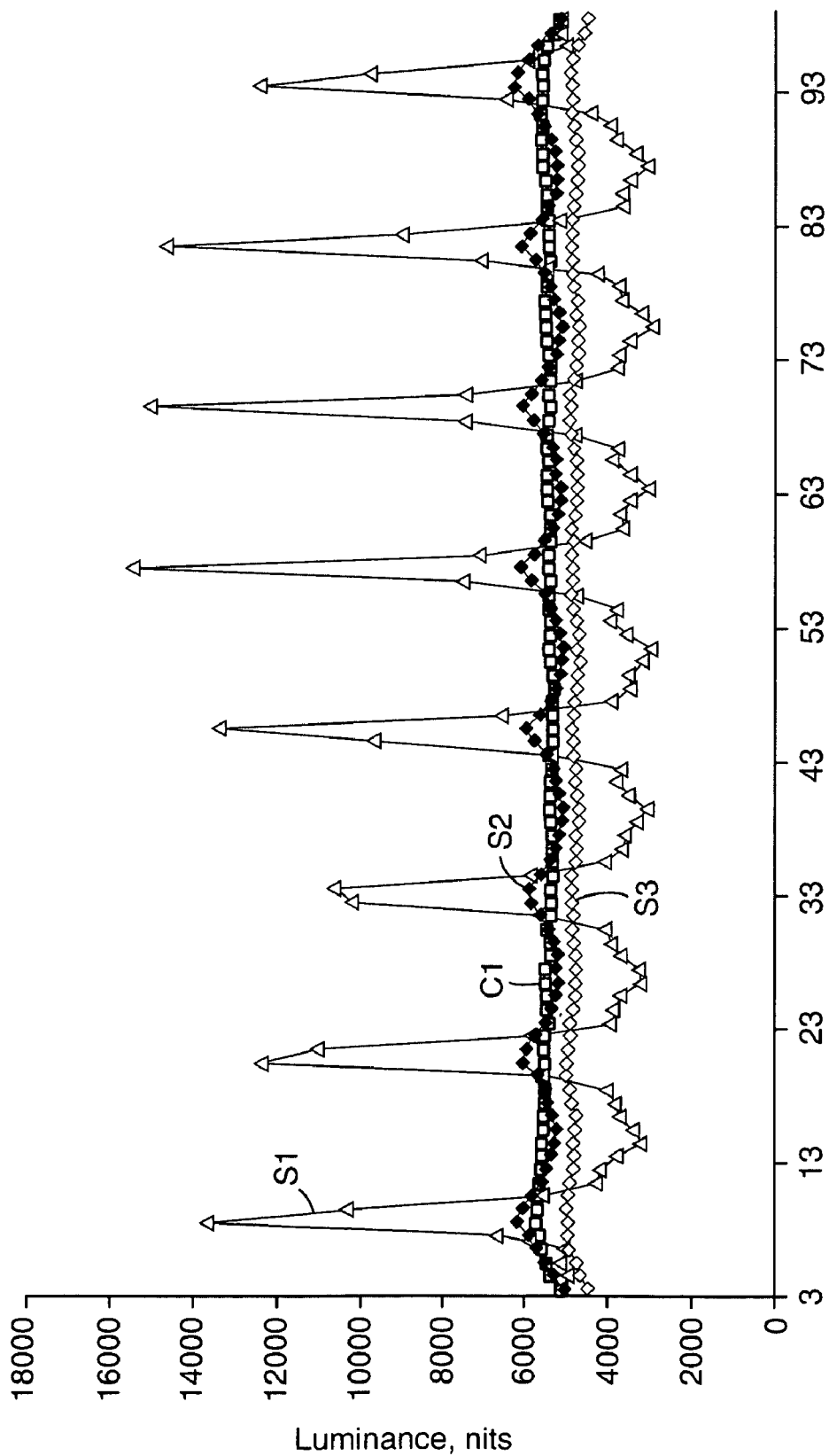
FIG. 8B presents a graph showing luminance as a function of position across a screen for a control sample and sample diffuser plates S1-S4.

The brightness measured across S1-S3 diffuser plates is shown as a function of position across the plates in FIG. 8B, with the results for control sample C1 shown for comparison. The single pass transmission for the samples reduces from S1 to S3. As the plate transmission decreases the brightness values also decrease. The illumination through the plates becomes more uniform (reduced a), however, with lower single pass transmission.

Samples S5-S10: Double-Sided Diffusers on LCD Glass

Samples S5, S8 and S10 were prepared the same way as samples S1-S3, except that diffuser films were laminated to both sides of the diffuser plate. Samples S5, S8, S10 were symmetric, in other words the diffuser layer was the same on both sides of the substrate. The diffuser films provided a diffusion characteristic that was uniform across the width of the samples.

Samples S6, S7 and S9 were asymmetric, using different diffusers on the sides of the substrate. Samples S6 and S7 were prepared the same way as S1 except that the second diffuser layer D2, was added, 3635-70 in the case of S6 and 3635-30 in the case of S7. Sample S9 was prepared the same way as S9, except that a 3635-30 diffuser layer was added as the D2 layer.

Figure 9:
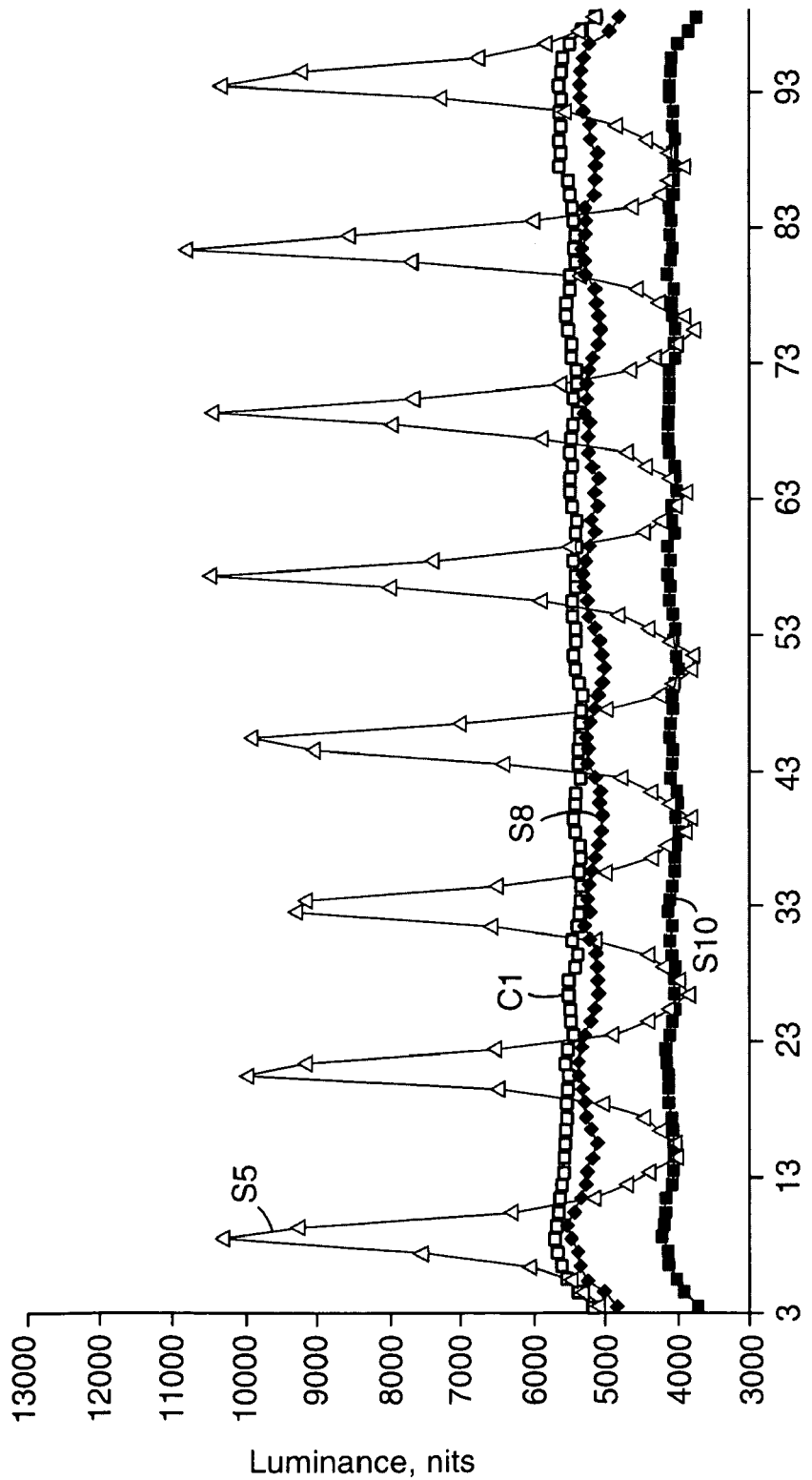
FIG. 9 presents a graph showing luminance as a function of position across a screen for a control sample and sample diffuser plates S5, S8 and S10.

The brightness through samples S5, S8 and S10 is shown as a function of position across the plate in FIG. 9, along with the measured values for C1. The performance of S8 most closely matches to that of C1: the luminance value for S8 is 5175 nits, compared with 5422 nits for C1, and the relative uniformity is 1.7% compared with 1.3% for C1, and 4.7% for C2. These data demonstrate that, by proper design of the diffuser plate laminate, a diffuser plate fabricated according to the present disclosure can be designed to have optical properties similar to those of a patterned diffuser plate.

This set of examples demonstrates that, by proper design of the diffuser element with the enhancing layers, an optimized light management assembly can be realized. It is important to realize that the optical performance of the laminated samples S2 and S8 approaches that even of the high quality diffuser C1. C1 was provided with a patterned diffuser, which increases the cost of the diffuser plate, in order to achieve high uniformity. In contrast, laminated samples S2 and S8 used a uniform diffuser.

Samples S19, S21 and S26: Single-Sided Diffusers on Different Materials

Figure 10:
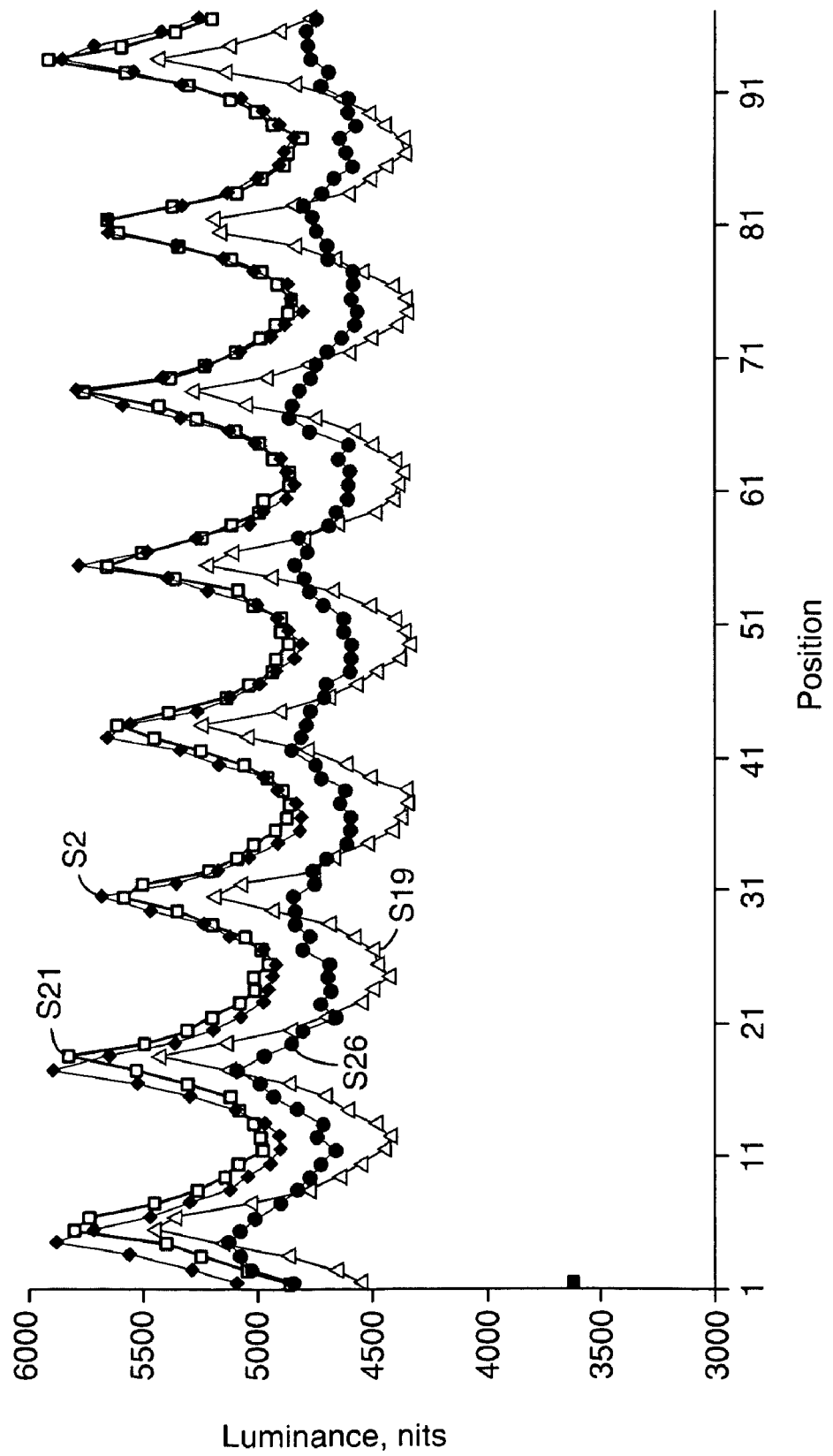
FIG. 10 presents a graph showing luminance as a function of position across a screen for sample diffuser plates S2, S19, S21 and 26.

Samples S19, S21 and S26 were made in the same way as S2, except that S19 used a substrate of 2 mm thick Lexan polycarbonate (PC), S21 used a substrate of 2 mm thick PMMA, and S26 used a 1 mm sheet of float glass (Industrial Glass Products, Los Angeles, Calif.). The brightness measurements across the plates are presented in FIG. 10 for S19, S21, and S26, along with the corresponding measurements for S2. The uniformity levels are similar in all three samples, but the single pass transmission through the PC plate was relatively low. These results suggest that the plate material may be an important variable in designing the diffuser plate.

Samples S20, S22 and S27: Double-Sided Diffusers on PC and PMMA

Figure 11:
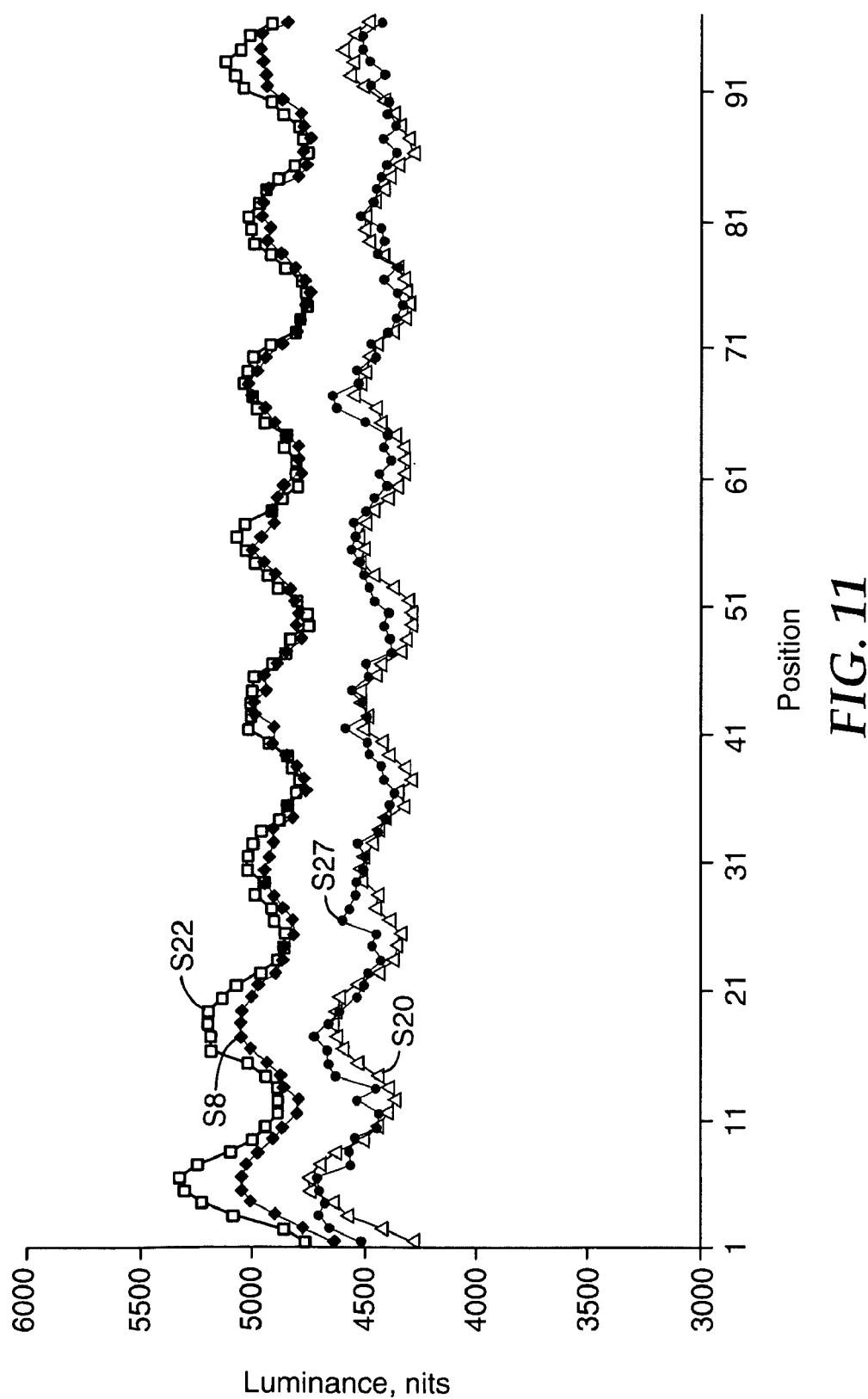
FIG. 11 presents a graph showing luminance as a function of position across a screen for sample diffuser plates S8, S20, S22 and 27.

Samples S20, S22 and S27 were made in the same way as S8, except that S20 used a substrate of 2 mm thick Lexan PC, S22 used a substrate of 2 mm thick PMMA, and S26 used a 1 mm sheet of float glass (Industrial Glass Products, Los Angeles, Calif.). The brightness measurements across the plates are presented in FIG. 11 for S20, S22 and S27, along with the corresponding measurements for S8. The uniformity levels are similar in all three samples, but the single pass transmission through the PC plate was relatively low.

Selected Samples with BEF/RP

Figure 12:
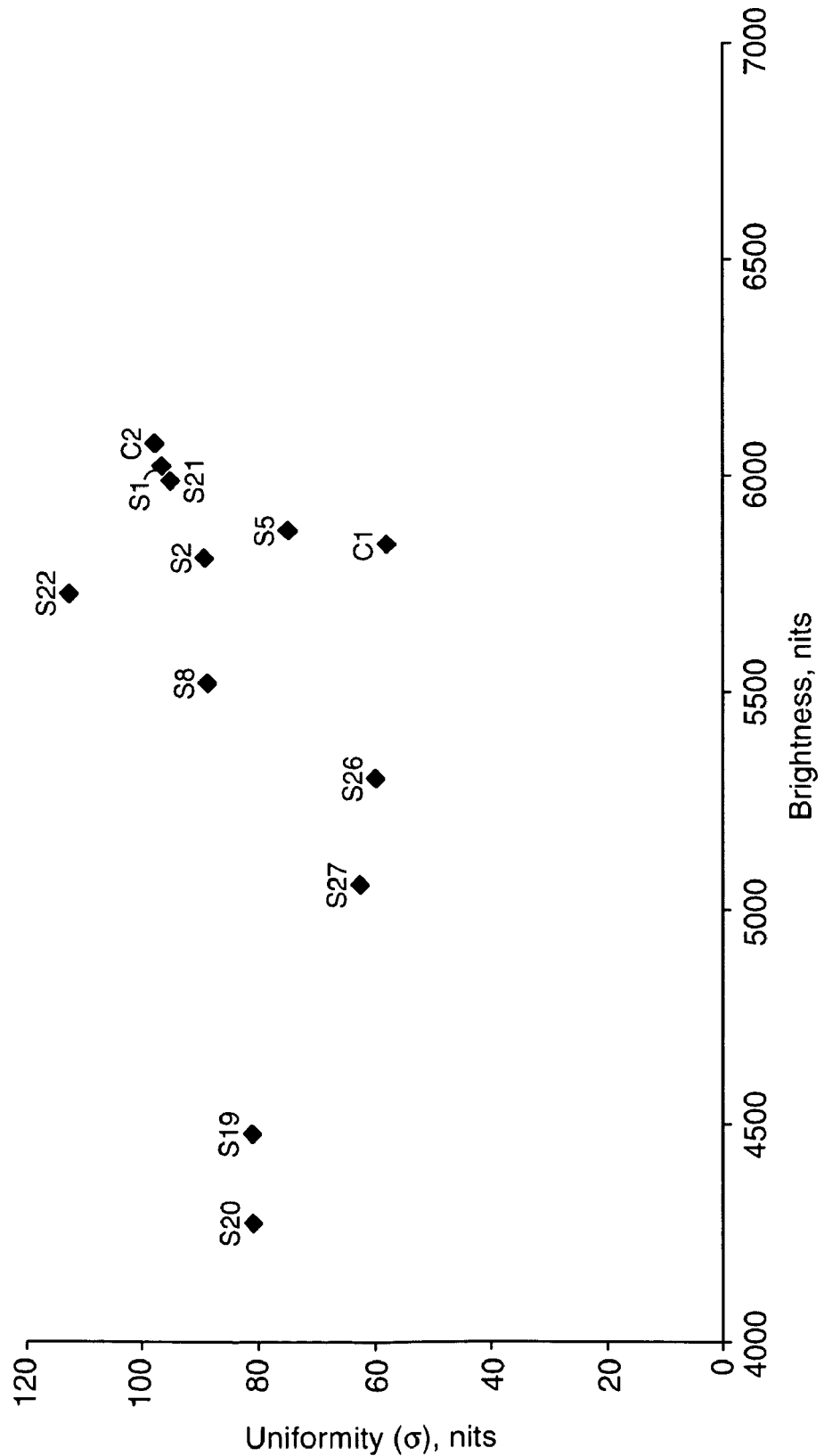
FIG. 12 presents a graph showing brightness uniformity plotted against overall brightness for control samples and example diffuser plates fabricated in accordance with principles of the present invention, when used with a brightness enhancing layer and a reflective polarizer.

Samples C-1, C-2, S1-S10 S19-S22, S26 and S27 were modified by placing a layer of Vikuiti™ DBEF-440 reflective polarizer (RP) and a layer of Vikuiti™ BEF-3T prismatic brightness enhancing film (BEF) above the diffuser plate, both films available from 3M Company, St. Paul, Minn. The brightness was measured as a function of position across the display. The results some of these measurements are summarized in Table II, which shows the luminance and the brightness uniformity in terms of the standard deviation, $\sigma$, in the luminance level across the display, and the relative uniformity, $\sigma/x$. For comparison, the relative uniformity of the diffuser plate when illuminated without the brightness enhancing film and reflective polarizer is shown in the last column, marked $\sigma/x$ (D). FIG. 12 shows a graph of uniformity plotted against illuminance.

The uniformity of the transmitted light improved for all samples, with the exception of S8, with the addition of the brightness enhancing film and the reflective polarizer. The uniformity of some of the S-samples, however, improved more than the control samples. For example, the uniformity S2 sample improved from 286 Nits to less than 100 Nits, and the relative uniformity improved from 5.2% to 1.5%, which was better than for C2. The luminance of S2 was approximately the same as for C1.

Figure 13:
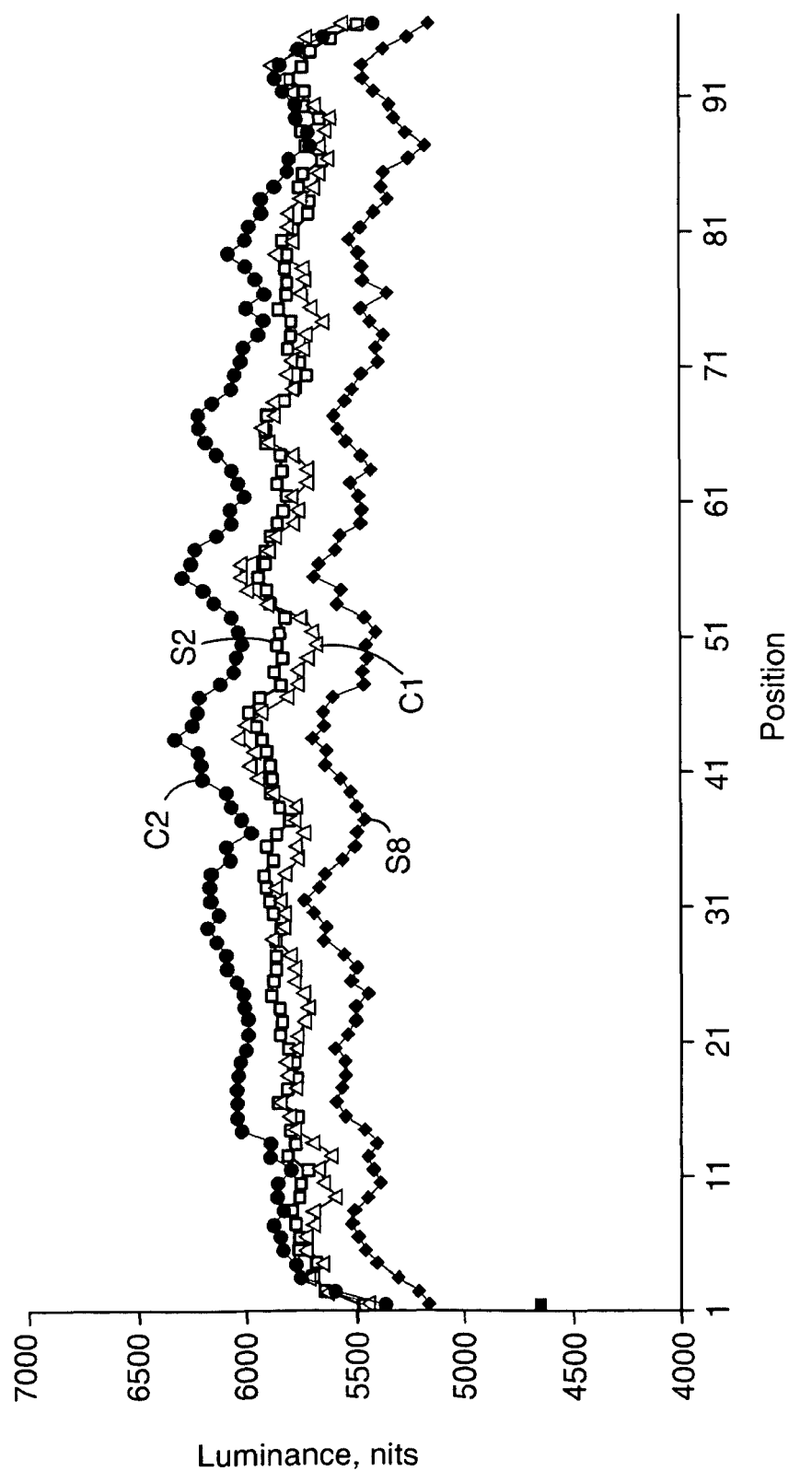
FIG. 13 presents a graph showing luminance as a function of position across a screen for two control samples and sample diffuser plates S2 and S8 when used with a brightness enhancing layer and a reflective polarizer.

The illuminance as a function of position across the display is shown in FIG. 13 for samples S2, S8, C1, and C2. These samples possessed on-axis gain values of 1.76, 1.70, 1.78, and 1.90, respectively. C2 showed higher overall transmission than modified S2, but was less uniform.

TABLE II

Summary of Diffuser Performance When Used With Brightness Enhancing Film and Reflective Polarizer

| Sample | Luminance (Nits) | σ (Nits) | σ/x | σ/x (D) |
|---|---|---|---|---|
| C1 | 5843.9 | 58.1 | 1% | 1.3% |
| C2 | 6076.0 | 97.9 | 1.6% | 4.7% |
| S2 | 5814.2 | 89.7 | 1.5% | 5.2% |
| S5 | 5638 | 73 | 1.3% | 35.6% |
| S8 | 5522.2 | 88.8 | 1.8% | 1.7% |
| S19 | 4478.1 | 81.3 | 1.8% | 6.0% |
| S20 | 4272.8 | 81.2 | 1.8% | 2.1% |
| S21 | 5989.0 | 95.3 | 1.6% | 4.5% |
| S22 | 5726.1 | 112.8 | 2.0% | 2.5% |
| S26 | 5298.6 | 60.0 | 1.1% | 2.3% |
| S27 | 5052.2 | 62.5 | 1.2% | 2.2% |

A study of the illuminance uniformity was made for various values of transmission in the range of about 77%-92%. Various samples like S1 were made, but with additional layers of the Scotchcal™ ElectroCut™ Graphic Film, type 7725-314 diffusive layer. The performance of these samples, S1a-S1d is listed in Table III below. Samples S1a-S1d had 2-5 layers of the diffuser on each side of the substrate (4-10 layers total), respectively.

TABLE III

Uniformity Study For High Transmission Diffusers

| Sample | T % | x, nits | σ, nits | σ/x % |
|---|---|---|---|---|
| C1 | 56.8 | 4345 | 38 | 0.87 |
| C2 | 70 | 4590 | 49 | 1.08 |
| S1 | 92.3 | 4521 | 88 | 1.94 |
| S5 | 86.8 | 4412 | 46 | 1.05 |
| S2 | 62 | 4351 | 45 | 1.04 |
| S1a | 85.7 | 4282 | 44 | 1.02 |
| S1b | 83.1 | 4104 | 37 | 0.91 |
| S1c | 80.1 | 3934 | 37 | 0.95 |
| S1d | 77.2 | 3800 | 35 | 0.93 |

Figure 19:
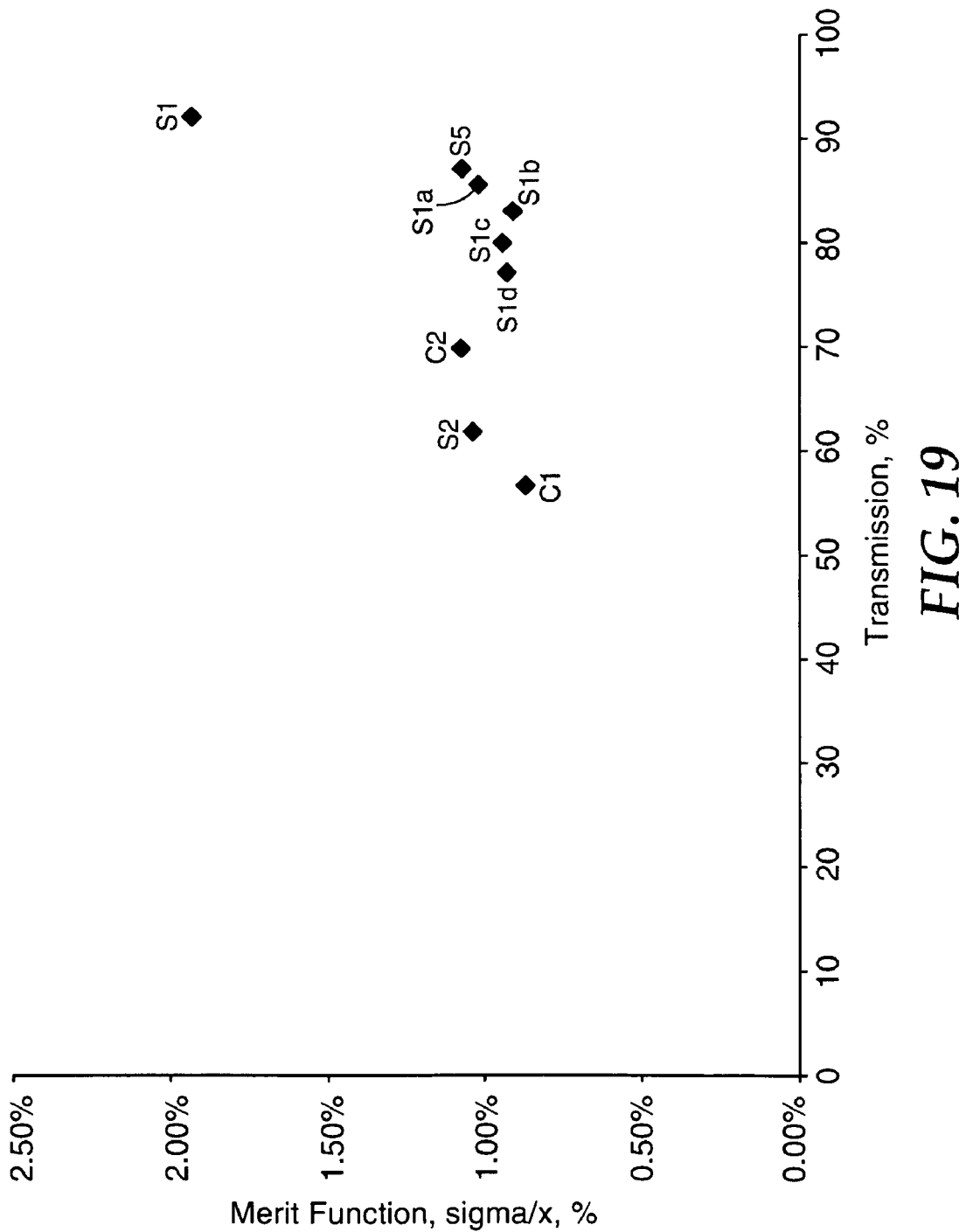
FIG. 19 presents a graph showing brightness uniformity plotted as a function of single pass transmission through the diffuser plate for several sample uniform diffuser plates and for a printed diffuser plate; and While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

These results for σ/x also shown in FIG. 19 as a function of single pass transmission, T. The 7725-314 diffusive layer had an absorption of around 2%, and so the transmission for samples S1a-S1d was reduced relative to the transmission of S1. However, the value of σ/x was very good, in most cases being less than 1%, which shows that a uniform diffusing layer can provide uniformity values approaching that of a patterned diffuser.

Conventional wisdom holds that increased illumination uniformity is achieved using relatively high levels of diffusion, which means relatively lower single pass transmission, typically around 70% or lower. The results presented in FIG. 19 show that the conventional wisdom is misleading when the diffuser is used in conjunction with a brightness enhancing layer, and that high illumination uniformity can be achieved using a uniform diffuser having a single pass transmission higher than 70%. In fact, where the diffuser is uniform, the relative uniformity is maximum in the range 75%-90%. It is believed that high levels of uniformity are possible with high diffuse transmission because the brightness enhancing layer interacts preferentially with light diffused by the diffuser at certain angles. Accordingly, preferred values of single pass transmission in the diffuser plate may be greater than 75%, 80%, or 85%, and ranges of single pass transmission may lie in the range 72%-95%, more preferably in the range 75%-90%. These single pass transmission values correspond to the single pass transmission through the combination of all diffuser layers present in the set of light management layers disposed between the light source(s) and the LCD panel.

Further Example

Single Sided Acrylic Foam Tape on PMMA

An additional example, Sample S28 was prepared with a 0.4 mm layer of acrylic foam tape (VHB 4643 tape, available from 3M Company, St. Paul, Minn.) as the diffuser layer on a 3 mm thick PMMA substrate. The diffusion characteristic of the acrylic foam tape was uniform. The performance of this sample, compared with an additional control sample, C3, is shown in Table III. The control sample was the diffuser plate taken from an SEC 40 inch LCD-TV Model No. 400W1 and was based on a 3 mm thick PMMA substrate containing diffusing particles.

TABLE III

Performance of Sample S28 compared to that of C3

| Characteristic | C3 | S28 |
|---|---|---|
| Single Pass Transmittance | 65% | 50% |
| Haze | ~100% | ~100% |
| Diffuser plate only | 4509 nit | 4431 nit |
| Diffuser Plate + BEF | 8229 nit | 8059 nit |
| Plate + absorbing polarizer | 2036 nit | 1979 nit |
| Diffuser plate + BEF + abs. polarizer | 3542 nit | 3440 nit |
| Diffuser plate + BEF + refl. polarizer + abs. polarizer | 4612 nit | 4496 nit |

The single pass transmittance and haze were made as single pass measurements, while the remaining measurements of illuminance were made with the diffuser plates in place on the SEC television, using the television's lamps. The illuminance was measured with various configurations of diffuser plate and other light management layers. The third row shows the illuminance for the diffuser plate only. In the case of comparative example C3, the diffuser plate was the PMMA sheet that contained diffuser particles. In the case of S28, the diffuser plate was the 3 mm thick PMMA plate with an acrylic foam tape diffuser mounted on one side.

The fourth row shows the illuminance when the diffuser plate was combined with a layer of brightness enhancing film (BEF) (Vikuiti™ BEF-3T film produced by 3M Company, St. Paul, Minn.). The fifth row shows the illuminance when the diffuser plate was combined with the absorbing polarizer used in the LC panel. The sixth row shows the illuminance when the diffuser plate was combined with the BEF and the absorbing polarizer. The seventh row shows the illuminance when the diffuser plate was combined with the BEF, a reflecting polarizer (Vikuiti™ DBEF-440 MOF reflecting polarizer), and the absorbing polarizer.

The single pass transmittance of S28 is a little lower than that for C3, but has a similar level of haze. Also, the illumination performance of S28 is only a few percent lower than that for C3, which is significant because the transmittance of S28 was not optimized for this test. Conoscopic plots showing the output from S28 and C3 are shown in FIGS. 14A and 14B respectively. The acrylic foam tape diffuser plate has a nearly isotropic distribution, similar to that of C3. Thus, it is believed that, with further optimization, acceptable optical characteristics can be achieved in a diffuser plate possible using acrylic foam tape as a diffuser.

Figure 15A:
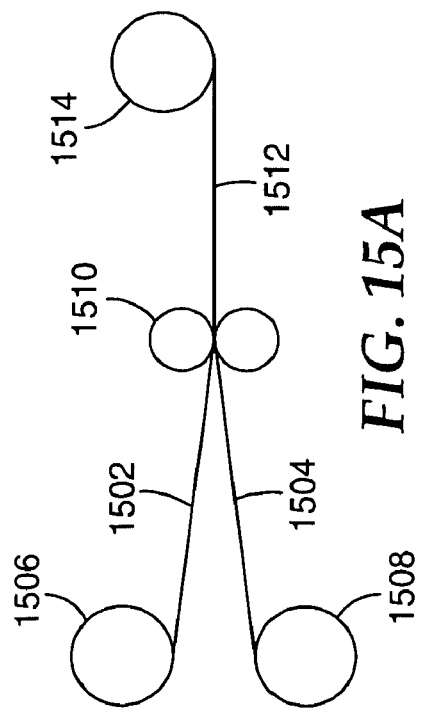
FIGS. 15A and 15B schematically present one embodiment of an arrangement for fabricating a diffuser plate according to the present invention.

The diffuser plates of the present invention may be fabricated using different approaches. One particular approach is now discussed with reference to FIGS. 15A and 15B. In this approach, a number of flexible films, for example diffuser, reflective polarizer and/or brightness enhancing films are first laminated together. The films may be directly laminated together or may be laminated using one or more intermediate adhesive layers. In the illustrated embodiment, a first film 1502 and a second film 1504 are taken off respective rolls 1506 and 1508 and laminated in a lamination roll 1510, as schematically shown in FIG. 15A. The laminated web 1512 may then be wound on a rewinding roll 1514. The laminated web 1512 may be a laminate of more than two films.

Figure 15B:
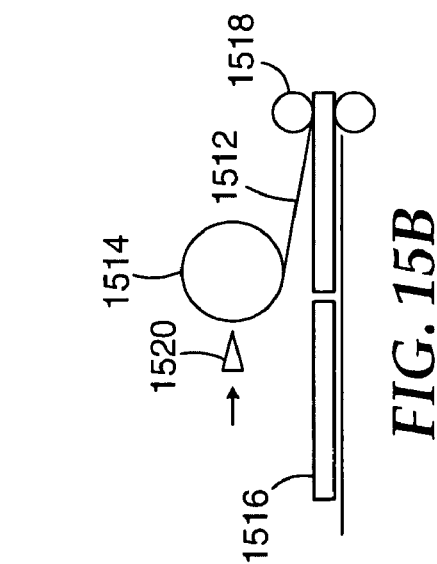

The laminated web 1512 may then be wound off the rewinding roll 1514, as is schematically shown in FIG. 15B, and laminated onto a series of substrate panels 1516 via a second lamination roll 1518. A cutting edge 1520 may be used to kiss cut the laminated web 1512 as it comes off the rewinding roll 1514 so as to form a length of laminated web 1512 appropriate for lamination to the substrate panel 1516. The cutting edge 1520 may instead be used to make a complete cut through the laminated sheet.

Figure 16A:
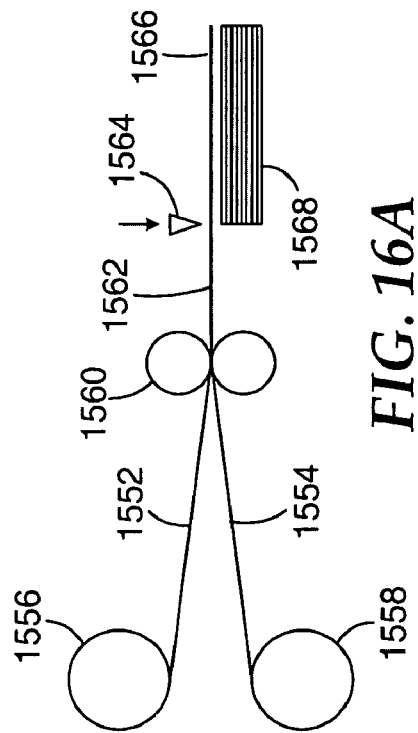
FIGS. 16A and 16B schematically present another embodiment of an arrangement for fabricating a diffuser plate according to the present invention.
Figure 16B:
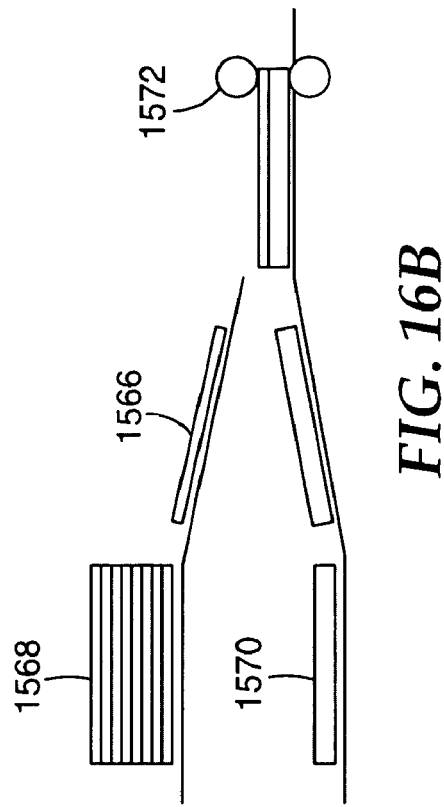

Another approach to fabricating a diffuser plate is now discussed with reference to FIGS. 16A and 16B. In this approach, a number of flexible films, for example, a diffuser film, a reflective polarizer layer and/or a brightness enhancing film are first laminated together. The films may be directly laminated together or may be laminated using one or more intermediate adhesive layers. In the illustrated embodiment, a first film 1552 and a second film 1554 are taken off respective rolls 1556 and 1558 and laminated in a lamination roll 1560, as is schematically illustrated in FIG. 16A. The resulting laminated web 1562 is then cut by a cutting tool 1564 into prepared laminate sheets 1566 of a desired length. The prepared laminate sheets 1566 may be formed into a stack 1568.

Individual laminate sheets 1566 from the stack 1568 may then be fed by a conveyor system onto respective substrate panels 1570. The conveyor system ensures that the laminate sheets 1566 are correctly aligned to their respective panels 1570. The laminate sheets 1566 may then be laminated to the substrate panel 1570, for example using a laminate roll 1572.

Figure 17:
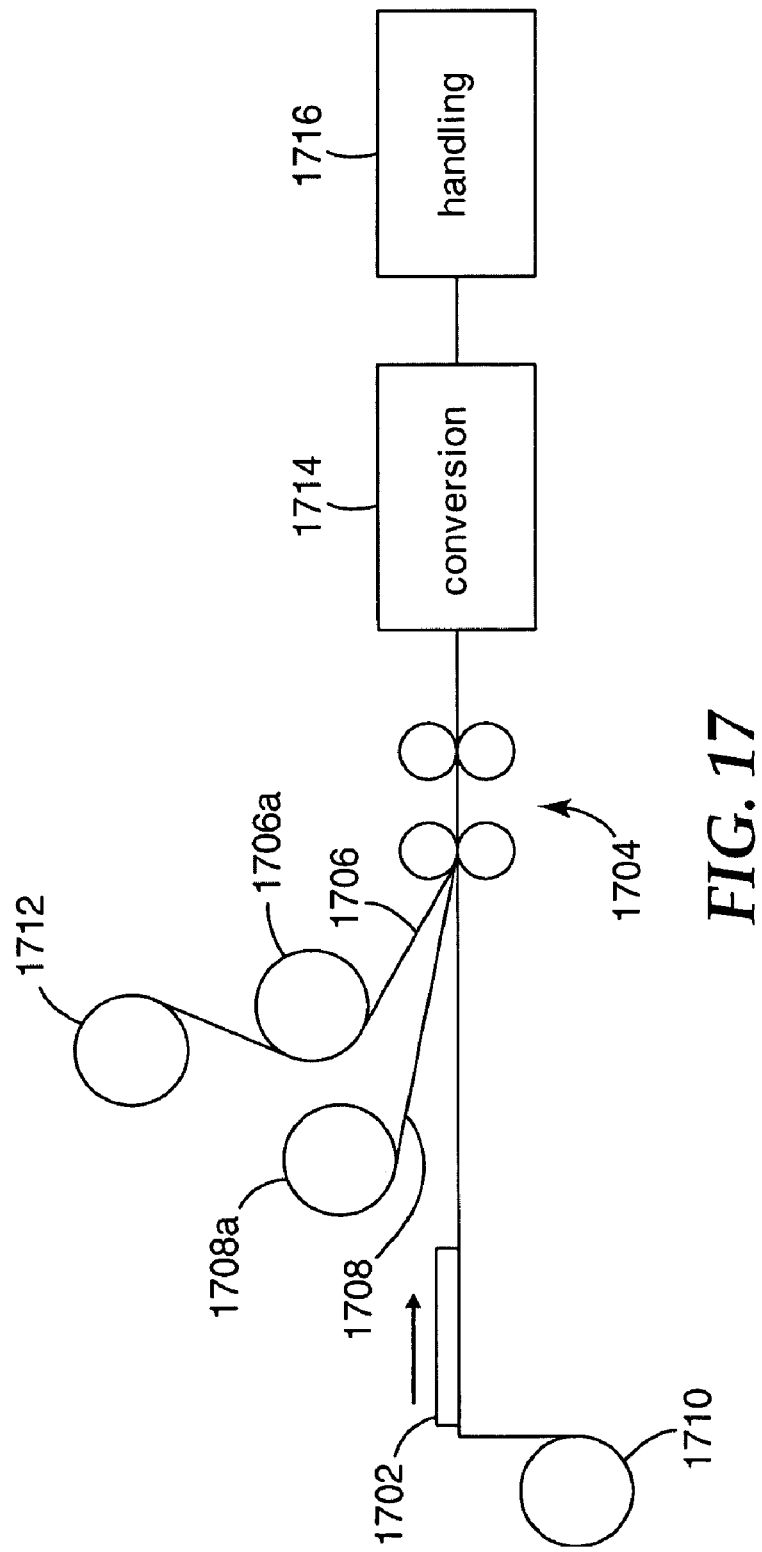
FIG. 17 schematically presents another embodiment of an arrangement for fabricating a diffuser plate according to the present invention.

Another approach to fabricating a diffuser plate according to the present invention is now described with reference to FIG. 17. Substrate panels 1702 are fed to a lamination stage 1704 where they are laminated with a number of films. In the illustrated embodiment, the substrate panels 1702 are laminated with two films 1706, 1708 that may be removed from respective rolls 1706a, 1708b. The substrate panels 1702 may optionally have a premask removed before lamination, for example by removing the premask using a removal roll 1710. Likewise, at least one of the films 1706, 1708 may have a premask removed, for example by premask removal roller 1712.

There may be one or more films laminated to the panels 1702 at the same time. The films laminated to the panels 1702 may include a diffuser layer, a reflecting polarizer and/or a brightness enhancing layer. For example, the intermediate layer 1708 may be a diffuser layer, such as an acrylic foam tape, while the upper layer 1706 is a reflective polarizer or a brightness enhancing layer, or a pre-formed combination of reflective polarizer and brightness enhancing layer.

After passing through the lamination stage, the laminated panels proceed to a conversion step 1714, for example, where film edges are trimmed and alignment notches are cut into the edges. After the conversion step, the panels proceed to a handling stage 1716 where they may be, for example, stacked and made ready for shipping.

Another approach to making a diffuser plate according to the present invention is now discussed with reference to FIGS. 18A and 18A. In this approach, a number of flexible films, for example a diffuser, reflective polarizer and/or brightness enhancing films are first laminated together, prior to lamination to the substrate. The films may be directly laminated together or may be laminated using one or more intermediate adhesive layers. This approach may be used to make, for example, the embodiments of diffuser plate illustrated in FIGS. 4F and 4G.

Figure 18A:
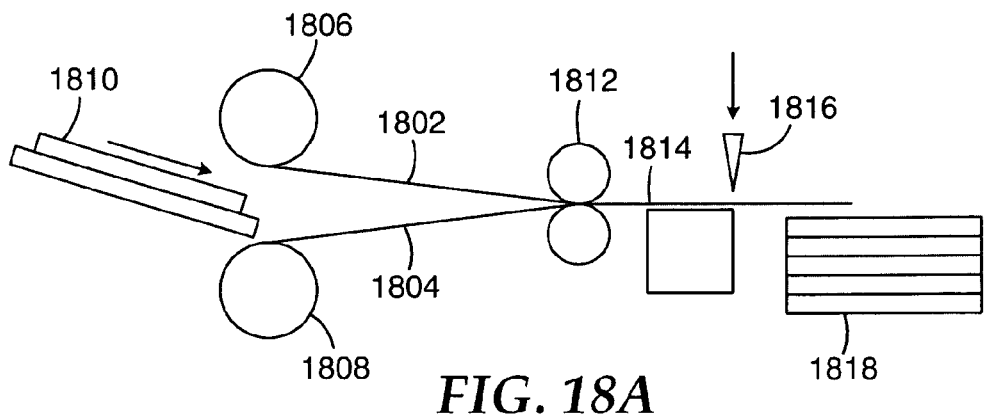
FIGS. 18A and 18B schematically present other embodiments of arrangements for fabricating laminated assemblies used in diffuser plates of the present invention.
Figure 18B:
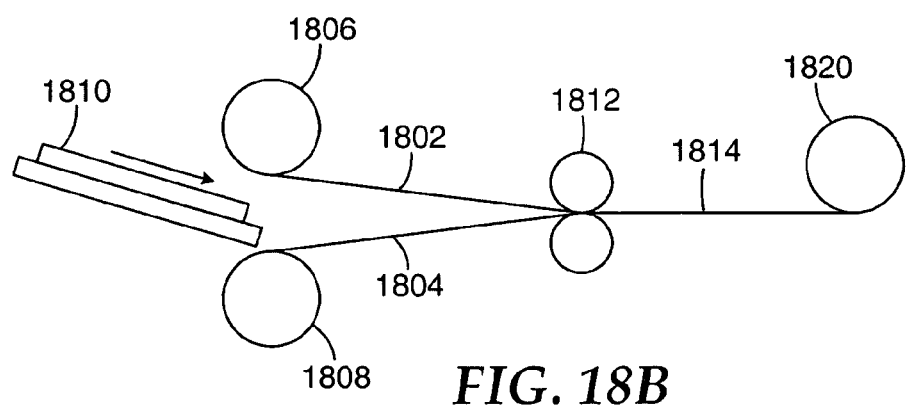

In the approach illustrated in FIG. 18A, a first film 1802, for example a diffuser sheet, and a second film 1804, for example a brightness enhancing film, are taken off respective rolls 1806 and 1808 and an intermediate layer 1810 is placed as a sheet between the two films 1802 and 1804. The three layers 1802, 1804 and 1810 are laminated together in the lamination roll 1812 to form a laminated web 1814. The laminated web 1814 is then cut into sheets by a cutting edge 1816 to form a stack of laminated sheets 1818. The laminated sheets 1818 may then be applied to respective substrates, for example in a process similar to that shown in FIG. 16B.

In a variation of the process shown in FIG. 18A, the laminated web 1814 is rewound onto a roll 1820 instead of being cut into separate sheets. The rolled, laminated web 1814 may then be applied to substrates, for example using a method similar to that illustrated in FIG. 15B.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. For example, free standing optical films may also be used within an LCD device alongside the diffuser plate attached with other optical layers. The claims are intended to cover such modifications and devices.

We claim:

1. A directly illuminated liquid crystal display (LCD) unit, comprising:
   a light source;
   an LCD panel comprising an upper plate, a lower plate and a liquid crystal layer disposed between the upper and lower plates, the lower plate facing the light source, the lower plate comprising an absorbing polarizer; and
   an arrangement of light management films disposed between the light source and the LCD panel so that the light source illuminates the LCD panel through the arrangement of light management films, the arrangement of light management films comprising at least a first diffuser layer, at least the first diffuser layer being attached to a lower surface of the lower plate of the LCD panel,
   wherein a value of $\sigma/x$ is less than 1.5%, where x is the level of illumination light passing from the arrangement of light management films to the LCD panel, averaged across the LCD panel, and $\sigma$ is the root mean square deviation in the level of illumination light across the arrangement of light management films.

2. A unit as recited in claim 1, wherein the single pass transmission through the first diffuser layer and any other diffuser in the arrangement of light management films is in the range of about 72%-95%.

3. A unit as recited in claim 1, wherein the value of $\sigma/x$ is less than 1.3%, and the diffuser plate has a single pass transmission of at least 75%.

4. A unit as recited in claim 1, wherein the arrangement of light management films further comprises a reflective polarizer and a brightness enhancing layer attached to the lower plate of the LCD panel, the reflective polarizer being disposed between the brightness enhancing layer and the lower panel.

5. A unit as recited in claim 1, wherein the arrangement of light management films further comprises a reflective polarizer and a brightness enhancing layer attached to the lower plate of the LCD panel, the brightness enhancing layer being disposed between the reflective polarizer and the lower panel.

6. A unit as recited in claim 1, wherein the arrangement of light management films further comprises a reflective polarizer attached to the lower plate.

7. A unit as recited in claim 1, wherein the arrangement of light management films comprises a stack of least a brightness enhancing layer and a reflective polarizer attached together, the stack being attached to the lower plate of the LCD panel.

8. A unit as recited in claim 1, wherein the arrangement of light management films provides a spatially uniform diffusion characteristic.

* * * * *

UNITED STATES PATENT AND TRADEMARK OFFICE
CERTIFICATE OF CORRECTION

PATENT NO.         : 8,125,589 B2
APPLICATION NO.    : 12/262546
DATED              : February 28, 2012
INVENTOR(S)        : Byungsoo Ko It is certified that error appears in the above-identified patent and that said Letters Patent is hereby corrected as shown below:

Column 14
Line 8, Delete ""a/x"" and insert -- "σ/x" --, therefor.

Column 15
Line 12, Delete "a)," and insert -- σ), --, therefor.

Signed and Sealed this
Twenty-eighth Day of August, 2012

David J. Kappos
*Director of the United States Patent and Trademark Office*